(12) United States Patent
Wakita et al.

(10) Patent No.: US 8,507,132 B2
(45) Date of Patent: Aug. 13, 2013

(54) ELECTRODE AND METHOD OF FABRICATING IT, AND BATTERY

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 12/093,930

(22) PCT Filed: Sep. 19, 2007

(86) PCT No.: PCT/JP2007/068177
§ 371 (c)(1),
(2), (4) Date: May 15, 2008

(87) PCT Pub. No.: WO2008/035707
PCT Pub. Date: Mar. 27, 2008

(65) Prior Publication Data
US 2008/0241705 A1    Oct. 2, 2008

(30) Foreign Application Priority Data

| Sep. 19, 2006 | (JP) | 2006-252215 |
| Feb. 6, 2007 | (JP) | 2007-027155 |
| Aug. 9, 2007 | (JP) | 2007-208401 |

(51) Int. Cl.
*H01M 10/056* (2010.01)
*H01M 4/13* (2010.01)
*H01M 4/60* (2006.01)
*H01M 4/62* (2006.01)

(52) U.S. Cl.
USPC ........... 429/212; 429/188; 429/199; 429/201; 429/209

(58) Field of Classification Search
None
See application file for complete search history.

(56) References Cited

U.S. PATENT DOCUMENTS

| 2001/0031391 A1 * | 10/2001 | Hironaka et al. ............... 429/94 |
| 2004/0002002 A1 | 1/2004 | Mizuta et al. |
| 2004/0048160 A1 * | 3/2004 | Omaru ....................... 429/231.4 |
| 2005/0058888 A1 * | 3/2005 | Aamodt et al. ................. 429/94 |
| 2006/0085972 A1 * | 4/2006 | Sudano et al. .............. 29/623.5 |
| 2006/0188784 A1 * | 8/2006 | Sudoh et al. .................. 429/232 |
| 2007/0031729 A1 | 2/2007 | Sato et al. |

FOREIGN PATENT DOCUMENTS

| JP | 9-204936 | 8/1997 |
| JP | 2003-288939 | 10/2003 |
| JP | 2004-022294 | 1/2004 |
| JP | 2004-071244 | 3/2004 |
| JP | 2004-111349 | 4/2004 |

(Continued)

OTHER PUBLICATIONS

Machine translation of JP 2004-022294, Jan. 2004.*

*Primary Examiner* — Jonathan Crepeau
(74) *Attorney, Agent, or Firm* — K&L Gates LLP

(57) ABSTRACT

A battery capable of obtaining a high energy density and obtaining superior cycle characteristics is provided. A spirally wound electrode body 20 having a lamination structure composed of a cathode 21, an anode 22, and a separator 23 is contained in a battery can 11. In the cathode 21, a cathode active material layer 21B containing an ambient temperature molten salt and a cathode active material is provided on a cathode current collector 21A. The content ratio of the ambient temperature molten salt in the cathode active material layer 21B is in the range from 0.1 mass % to 5 mass %. The ambient temperature molten salt is, for example, a tertiary or quaternary ammonium salt that is composed of a tertiary or quaternary ammonium cation and an anion having a fluorine atom.

12 Claims, 9 Drawing Sheets

(56) References Cited

FOREIGN PATENT DOCUMENTS

| | | |
|---|---|---|
| JP | 2004-165131 | 6/2004 |
| JP | 2004-307481 | 11/2004 |
| JP | 2004-331521 | 11/2004 |
| JP | 2006-139968 | 6/2006 |
| WO | 02/076924 | 10/2002 |
| WO | 2005-064712 | 7/2005 |

* cited by examiner

ELECTRODE AND METHOD OF FABRICATING IT, AND BATTERY

CROSS REFERENCES TO RELATED APPLICATIONS

The present application claims priority to Japanese Patent Application Nos. 2006-252215 filed on Sep. 19, 2006; 2007-027155 filed on Feb. 6, 2007; and 2007-208401 filed on Aug. 9, 2007, the entire contents of which are being incorporated herein by reference.

BACKGROUND

The present invention relates to an electrode containing an ambient temperature molten salt and a method of fabricating it, and a battery. The present invention further relates to a (coating) mixture suitable for forming a cathode and a cathode formed from the mixture, and a battery. The present invention further relates to a (coating) mixture suitable for forming a lamination type stacked battery and an electrode formed from the mixture, and a battery.

In recent years, downsizing and weight saving of portable electronic devices typified by a mobile phone, a PDA (personal digital assistant), and a notebook personal computer have been actively promoted. As part thereof, improving the energy density of batteries, in particular secondary batteries as the driving power source thereof has been strongly aspired.

To improve the energy density of the secondary battery with the small volume and the small mass, the voltage per one battery should be high. From such a view point, in recent years, a nonaqueous electrolytic solution battery using, for example, a lithium-based composite metal oxide as a cathode active material and using a carbon material capable of inserting lithium or lithium ions as an anode active material has attracted attention. For example, a lithium ion secondary battery in which a cathode plate using a lithium composite oxide made of $LiCoO_2$ or the like as a cathode material and an anode plate using a carbon material or the like that inserts and extracts lithium ions as an anode material are layered with a nonaqueous electrolyte in between has been known.

As the lithium ion battery, a spirally wound type battery in which a strip-shaped cathode electrode and a strip-shaped anode electrode are layered with a separator in between and then spirally wound to form a battery element, and the battery element is contained in a package container; and a lamination type secondary battery in which a flat cathode electrode and a flat anode electrode are layered with a separator in between to form a laminated body as a battery element, and the battery element is contained in a package container have been known.

In general, the cathode plate of the lithium ion secondary battery is manufactured by coating a current collector with cathode mixture slurry containing the foregoing lithium composite oxide (cathode active material), a binder, and an organic solvent, and then drying the cathode mixture slurry. As the binder, a vinylidene fluoride-based polymer, an acrylonitrile-based polymer or the like that has the low resistivity, the favorable battery characteristics, and the relatively superior formability is preferable and practically used.

The technique for the lithium ion secondary battery has been already developed to the degree close to the theoretical capacity. Thus, as a means for further improving the energy density of the lithium ion secondary battery, it is considered to increase the ratio of the active material layer in the battery by increasing the thickness of the active material layer and to decrease the ratio of the current collector and the ratio of the separator (Patent Document 1).

Further, to improve the energy density of the lithium ion secondary battery, it is considered to improve the capacity per unit weight of the electrode material. In recent years, a lithium ion secondary battery using a cathode active material having a main component of a lithium nickel composite oxide containing at least lithium element and nickel element such as $LiNiO_2$, and $LiNi_xCo_yO_2$ instead of $LiCoO_2$ has been developed. The capacity per unit weight of the lithium nickel composite oxide (180 to 200 mAh/g) is considerably larger than the capacity per unit weight of $LiCoO_2$ (145 to 150 mAh/g).

Patent Document 1: Japanese Unexamined Patent Application Publication No. 9-204936

SUMMARY

As a means for improving the energy density of the lithium ion secondary battery, it is considered to increase the thickness of the active material layer (Patent document 1). However, in general, it is often the case that the cathode and the anode structures a spirally wound body. If the thickness of such a spirally wound active material layer is increased to a certain degree, a portion having a relatively large curvature in the active material layer does not tolerate stress concentration, and may generate a damage such as a crack and separation. To address such a problem, it has been tried to improve the flexibility (elasticity) as the active material layer by using a resin having a higher molecular weight as a binder that is a component of the active material layer. However, sufficient effects have not been achieved. Meanwhile, if a flexible rubber binder is used, the problem such as a crack and separation of the active material layer is resolved. However, it is difficult to improve the electrode density and the permeability of lithium ions is low, and therefore there are still problems remaining with regard to the battery characteristics.

Further, to improve the capacity per unit weight of the electrode material, a lithium ion secondary battery using a cathode active material having a main component of a lithium nickel composite oxide has been developed. However, if a vinylidene fluoride-based polymer or an acrylonitrile-based polymer is used as a binder in such a lithium ion secondary battery, there is a problem that a high-alkaline component remaining on the surface of the lithium nickel oxide reacts with the vinylidene fluoride-based polymer or the acrylonitrile-based polymer, and thus the cathode mixture slurry loses the fluidity and is gelated. Once the cathode mixture slurry is gelated, even if the slurry is heated or even if a new solvent is added, only nonuniform slurry is obtained. In the result, it becomes extremely difficult to coat the current collector with the cathode mixture slurry.

As a method to avoid the gelation of the cathode mixture slurry, in Japanese Unexamined Patent Application Publication No. 2000-90917, a lithium nickel composite oxide material containing a lithium nickel composite oxide is dispersed at 8 to 12 mass % to water together with, for example, $Li_2O$ to form a dispersion liquid, the dispersion liquid having pH of from 7.1 to 11.2 is filtered to remove a residue, which is dried to generate a cathode material. However, this method costs time. Further, it is difficult to adjust the pH. Furthermore, $Li_2CO_3$ generated in the course of adjusting the pH remains in the manufactured cathode material after filtering the dispersion liquid. Therefore, in the method described in Japanese Unexamined Patent Application Publication No. 2000-90917, there is a problem that the cathode material contains unintended $Li_2CO_3$ in addition to the lithium nickel composite oxide, and the battery system is thereby adversely affected.

Further, for the purpose of avoiding the gelation of the cathode mixture slurry, in Japanese Unexamined Patent Application Publication No. 11-195419, a binder capable of preventing the gelation is proposed. In mixture slurry for forming a nonaqueous battery cathode containing a vinylidene fluoride-based polymer as a binder, a vinylidene fluoride-based polymer composed of 70 or more mol % vinylidene fluoride and at least 0.5% or more chlorotrifluoroethylene is used as a binder, and thereby gelation of the binder containing the vinylidene fluoride-based polymer is specifically prevented.

However, when the vinylidene fluoride-based polymer is copolymerized, the high adhesion function to the current collector as a primary function is extremely lowered. Further, there is a problem that the swelling property to the electrolytic solution is increased, and electron conduction in the electrode is thereby prevented to lower the battery characteristics. Furthermore, as a result of consideration by the inventors of the present invention, even if the vinylidene fluoride-based polymer is copolymerized, about several % to 30% thereof is copolymerized, and thus reaction between the high-alkaline component and the vinylidene fluoride-based polymer (hereinafter also referred to as de-HF reaction) is not totally avoided structurally. Furthermore, there is a problem that since excessive increase of the copolymer ratio results in lowered adhesion function, the gelation is not totally avoided.

A battery with the electrolyte containing a carbonate-based nonaqueous solvent has extremely superior battery characteristics such as the load characteristics and the cycle characteristics. However, if the battery is in an unstable mode (being heated, overcharged, crushed, needle-stuck and the like), since the reactivity between the electrolytic solution and the active material layer is high, the battery easily generates heat and may take fire. Therefore, securing higher stability is demanded.

Further, the laminated body of the battery element composing the lamination type secondary battery is composed of the lamination in which the flat cathode electrode and the flat anode electrode are layered with the separator in between. In the flat cathode electrode, a cathode active material layer is formed on a cathode current collector. Part of the cathode current collector as a cathode lead terminal extends outward from a portion opposed to the counter electrode. Similarly, in the anode electrode, an anode active material layer is formed on an anode current collector. Part of the anode current collector as an anode lead terminal extends outward from a portion opposed to the counter electrode. However, there is always a problem that when these electrodes are punched out into a specified form with the use of a die, the mixture at the end thereof is dropped.

In general, as the electrode binder for the lithium ion secondary battery, the vinylidene fluoride-based polymer that has low resistivity, favorable battery characteristics, and relatively superior formability is preferable and practically used. Dropping of the mixture is mainly caused by the adhesive strength and the flexibility in the electrode. If the excessive amount of the binder is used to increase the adhesive strength between the mixture and a foil or between respective particles, the battery capacity is relatively lowered and a battery having a high energy density is not able to be obtained. Thus, this method does not result in fundamental resolution.

To address such a problem, it has been tried to improve the flexibility (elasticity) as the active material layer by using a resin having a higher molecular weight as a binder that is a component of the active material layer. However, as a result of considerations by the inventors of the present invention, sufficient effects have not been obtained. Meanwhile, if a flexible rubber-based binder is used, the problem such as a crack and separation of the active material layer is solved to some extent. However, it is difficult to improve the battery density and the permeability of lithium ions is low, and therefore there are still problems remaining with regard to the battery characteristics.

In view of the foregoing problems, it is an object of the present invention to provide an electrode that prevents the gelation of the cathode mixture slurry due to the use of the high capacity lithium nickel composite oxide, is greatly flexible, prevents the mixture dropping when being punched out with the use of a die, and is suitable for maintaining the structurally stable quality; and a method of fabricating it. It is another object of the present invention to provide a battery having the superior stability capable of obtaining superior cycle characteristics while securing the high energy density by providing such an electrode.

An electrode according to the present invention includes a current collector and an active material layer containing an ambient temperature molten salt and an active material and being provided on the current collector. The active material layer is obtained by coating the current collector with electrode mixture slurry containing a solvent together with the ambient temperature molten salt and the active material, and then volatilizing the solvent. The active material layer is used by being impregnated in an electrolytic solution containing a carbonate-based nonaqueous solvent.

A battery according to the present invention includes a cathode, an anode, and an electrolytic solution. At least one of the cathode and the anode has a current collector and an active material layer that contains an ambient temperature molten salt and an active material and is provided on the current collector. The active material layer is obtained by coating the current collector with electrode mixture slurry containing a solvent together with the ambient temperature molten salt and the active material, and then volatilizing the solvent. The electrolytic solution contains a carbonate-based nonaqueous solvent.

The electrode and the battery according to the present invention have the sufficient flexibility and the sufficient mixture retention characteristics since the active material layer contains an appropriate amount of the ambient temperature molten salt together with the active material. Thus, for example, even if the high energy density electrode having the thick active material layer is used or a large curvature is applied, the electrode and the battery have a structure in which a crack or the like is not easily generated. Further, in the electrode and the battery according to the present invention, favorable ion mobility is secured. Thus, both improvement of the flexibility and improvement of the battery characteristics may be achieved at the same time. Further, in the electrode and the battery according to the present invention, since the active material layer contains the ambient temperature molten salt, a coat is formed by the ambient temperature molten salt on the surface of the active material layer, and reaction between the active material and the electrolyte is suppressed. Accordingly, even if the battery is in an unstable mode, heat generation may be prevented.

Further, in the electrode and the battery according to the present invention, since the active material layer contains the ambient temperature molten salt, gelation of the cathode mixture slurry caused if the cathode active material mainly containing the lithium nickel composite oxide and the binder mainly containing a vinylidene fluoride-based polymer or an acrylonitrile-based polymer are used may be avoided.

A method of fabricating an electrode according to the present invention includes the steps of fabricating electrode mixture slurry by mixing at least an ambient temperature molten salt, an active material, and a solvent, and forming an active material layer on a current collector by coating the current collector with the electrode mixture slurry and then volatilizing the solvent.

According to the method of fabricating an electrode of the present invention, the ambient temperature molten salt, the active material, and the solvent are mixed together, and the paste electrode mixture slurry is formed once. After the current collector is coated with the paste electrode mixture slurry, the solvent is removed. Thus, while the content ratio of the ambient temperature molten salt is decreased, the sufficient flexibility in the electrode active material layer is secured.

Further, in the method of fabricating an electrode according to the present invention, since the electrode mixture slurry contains the ambient temperature molten salt, gelation of the cathode mixture slurry caused if the cathode active material mainly containing the lithium nickel composite oxide and the binder mainly containing a vinylidene fluoride-based polymer or an acrylonitrile-based polymer are used may be avoided, and favorable cathode mixture slurry is obtained.

The electrode of the present invention has the active material layer containing the appropriate amount of the ambient temperature molten salt obtained by volatilizing the solvent from the electrode mixture slurry coated on the current collector. Therefore, the sufficient flexibility and the high mixture retention characteristics may be secured. Even if curvature is applied or even if the electrode is punched out with the use of a die, a highly reliable lamination type secondary battery capable of maintaining the structurally stable quality may be obtained.

Further, the electrode according to the present invention is prepared so that the ambient temperature molten salt is contained in the electrolyte mixture slurry. Thus, polymerization reaction between a high-alkaline component remaining on the surface of the lithium nickel composite oxide and the vinylidene fluoride-based polymer or the acrylonitrile-based polymer that is generated when the cathode active material mainly containing the lithium nickel composite oxide and the binder mainly containing the vinylidene fluoride-based polymer or the acrylonitrile-based polymer are used may be prevented. In addition, gelation of the cathode mixture slurry may be suppressed.

The battery of the present invention includes the electrode in which the active material layer contains the ambient temperature molten salt obtained as above. Thus, a high energy density and superior cycle characteristics may be obtained. Further, since the coat of the ambient temperature molten salt covering the active material layer is formed, gas generation from inside of the battery at high temperature is prevented, and the safety may be improved.

Moreover, according to the battery of the present invention, the electrode previously contains the ambient temperature molten salt, the abundant ambient temperature molten salt not generating heat further exists in the vicinity of the interface of the active material, or the binder is modified by inserting the ambient temperature molten salt therein. Thus, even if the battery having the electrolyte containing the carbonate-based nonaqueous solvent is in an unstable mode (being heated, overcharged, crushed, needle-stuck and the like), the reactivity between the active material and the organic solvent or the binder swollen with the organic solvent is prevented, and heat generation may be prevented.

According to the method of fabricating an electrode of the present invention, when the active material layer is formed on the current collector, the current collector is coated with the electrode mixture slurry with which the solvent together with the ambient temperature molten salt and the active material are previously mixed, and then the solvent is volatilized. Therefore, the sufficient flexibility may be secured. Even if curvature is applied or even if the electrode is punched out with the use of a die, an electrode capable of maintaining the structurally stable quality may be realized.

Further, according to the method of fabricating an electrode of the present invention, the electrode mixture slurry contains the ambient temperature molten salt. Thus, if the cathode active material mainly containing the lithium nickel composite oxide and the binder mainly containing the vinylidene fluoride-based polymer or the acrylonitrile-based polymer are used, the ambient temperature molten salt selectively adhering to the surface of the cathode active material acts on the vinylidene fluoride-based polymer or the acrylonitrile-based polymer, and thereby polymer reaction between the high-alkaline component remaining on the lithium nickel oxide and the vinylidene fluoride-based polymer or the acrylonitrile-based polymer is prevented. Thereby, favorable cathode mixture slurry with gelation prevented may be obtained, and an electrode having the high energy density may be formed.

Additional features and advantages are described herein, and will be apparent from, the following Detailed Description and the figures.

DETAILED DESCRIPTION

Embodiments of the present invention will be hereinafter described in detail with reference to the drawings.

(1) First Embodiment
(1-1) Structure of Secondary Battery

Figure 1:
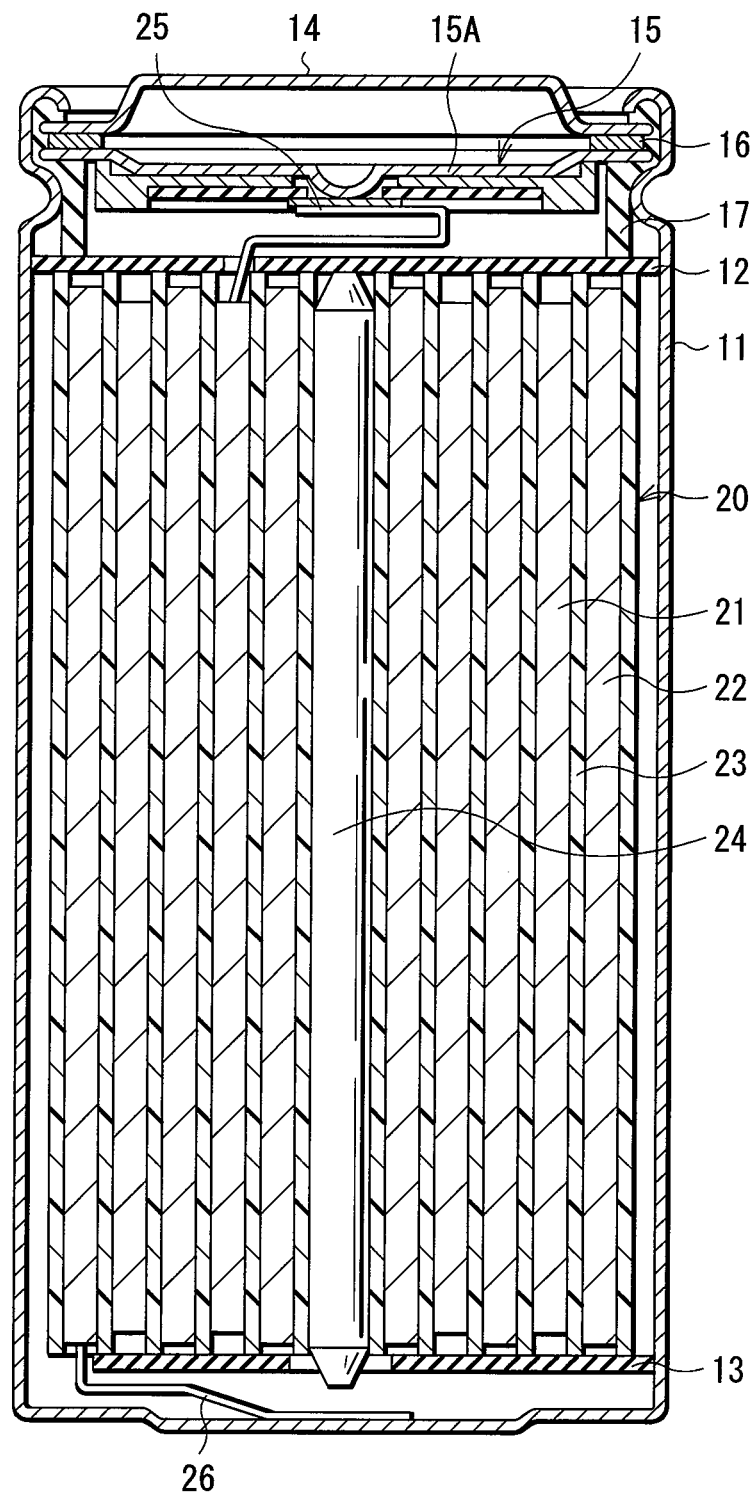
FIG. 1 A cross section showing a structure of a nonaqueous electrolyte secondary battery according to a first embodiment of the present invention.

FIG. 1 shows a cross sectional structure of a secondary battery according to a first embodiment of the present invention. The secondary battery is a so-called cylinder type battery, and has a spirally wound electrode body 20 in which a strip-shaped cathode 21 and a strip-shaped anode 22 are spirally wound with a separator 23 in between inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12, 13 is respectively arranged perpendicular to the spirally wound periphery face, so that the spirally wound electrode body 20 is sandwiched between the insulating plates 12, 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is hermetically closed. The battery cover 14 is, for example, made of a material similar to that of the battery can 11. The safety valve mechanism 15 is electrically connected to the battery cover 14 with the PTC device 16 in between. If the internal pressure of the battery becomes a certain level or more by internal short circuit, external heating or the like, a disk plate 15A flips to cut the electrical connection between the battery cover 14 and the spirally wound electrode body 20. If temperature rises, the PTC device 16 limits the current by increasing the resistance value to prevent abnormal heat generation by the large current. The gasket 17 is made of, for example, an insulating material and its surface is coated with asphalt.

A center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
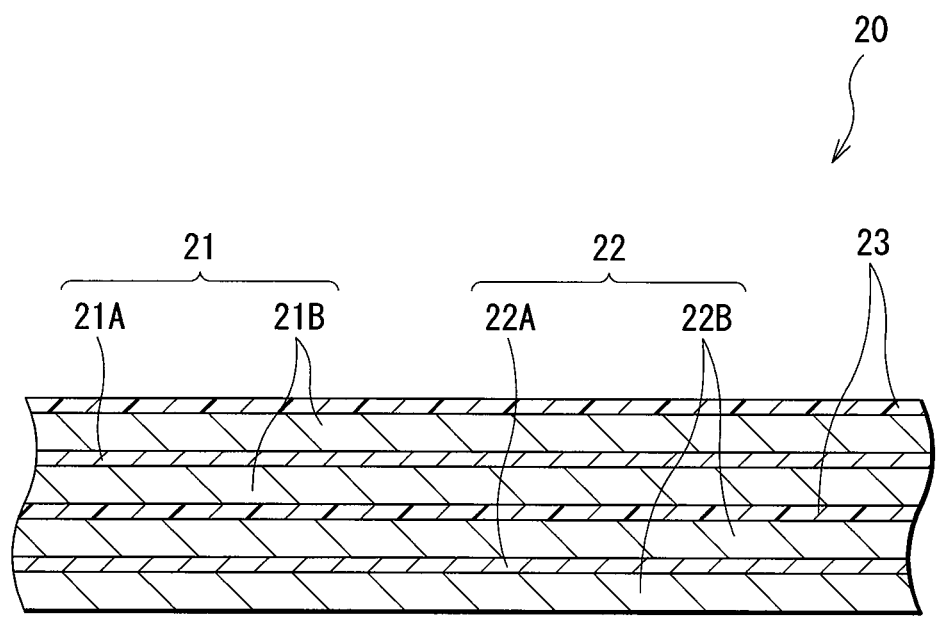
FIG. 2 A cross section showing an enlarged part of a spirally wound electrode body in the secondary battery shown in FIG. 1.

FIG. 2 shows an enlarged part of the spirally wound electrode body 20 shown in FIG. 1. The cathode 21 has, for example, a structure in which a cathode active material layer 21B is provided on the both faces of a cathode current collector 21A having a pair of opposed faces. Though not shown, the cathode active material layer 21B may be provided only on a single face of the cathode current collector 21A.

The cathode current collector 21A is made of a metal foil such as an aluminum foil, a nickel foil, and a stainless foil.

The cathode active material layer 21B contains, for example, as a cathode active material, a cathode material capable of inserting and extracting lithium as an electrode reactant.

As the cathode material capable of inserting and extracting lithium, for example, a lithium oxide, a lithium nitride, and a lithium-containing compound such as an interlayer compound containing lithium and a phosphate compound containing lithium are appropriate. Two or more thereof may be used by mixing. Specially, a composite oxide containing lithium and a transition metal element, or a phosphate compound containing lithium and a transition metal element is preferable. In particular, a compound containing, as a transition metal element, at least one of cobalt (Co), nickel, manganese (Mn), iron, aluminum, vanadium (V), and titanium (Ti) is preferable. The chemical formula thereof is expressed as, for example, $Li_xMIO_2$ or $Li_yMIIPO_4$. In the formula, MI and MII include one or more transition metal elements. Values of x and y vary according to the charge and discharge state of the battery, and are generally in the range of $0.05 \leq x \leq 1.10$ and $0.05 \leq y \leq 1.10$.

As a specific example of the composite oxide containing lithium and a transition metal element, a lithium cobalt composite oxide ($Li_xCoO_2$), a lithium nickel composite oxide, lithium manganese composite oxide having spinel type structure ($LiMn_2O_4$) and the like is cited. As the lithium nickel composite oxide, for example, $LiNi_xCo_{1-x}O_2$ ($0 \leq x \leq 1$), $Li_xNiO_2$, $LiNi_xCo_yO_2$, $Li_xNi_{1-z}Co_zO_2$ ($z<1$) or the like is cited. As a specific example of the phosphate compound containing lithium and a transition metal element, for example, lithium iron phosphate compound ($LiFePO_4$), a lithium iron manganese phosphate compound [$LiFe_{1-u}Mn_uPO_4$ ($u<1$)] and the like is cited.

Further, as the cathode material capable of inserting and extracting lithium, other metal compound and a polymer material is also cited. As other metal component, for example, an oxide such as titanium oxide, vanadium oxide, and manganese dioxide; or a disulfide such as titanium sulfide and molybdenum sulfide is cited. As the polymer material, for example, polyaniline, polythiophene or the like is cited.

The anode 22 has, for example, a structure in which an anode active material layer 22B is provided on the both faces of an anode current collector 22A having a pair of opposed faces. Though not shown, the anode active material layer 22B may be provided only on a single face of the anode current collector 22A. The anode current collector 22A is made of, for example, a metal foil such as a copper foil, a nickel foil, and a stainless foil.

The anode active material layer 22B contains, for example, as an anode active material, one or more anode materials capable of inserting and extracting lithium as an electrode reactant. If necessary, the anode active material layer 22B may contain an electrical conductor and a binder similar to those of the cathode active material layer 21B, for example.

As the anode material capable of inserting and extracting lithium, for example, a carbon material such as graphite, non-graphitizable carbon, and graphitizable carbon is cited. The carbon material is preferable, since change in the crystal structure generated in charge and discharge is very little, a high charge and discharge capacity may be obtained, and favorable charge and discharge cycle characteristics may be obtained. In particular, graphite is preferable, since the electrochemical equivalent is high and a high energy density may be obtained.

As the graphite, a graphite having a true density of 2.10 $g/cm^3$ or more is preferable, and a graphite having a true density of 2.18 $g/cm^3$ or more is more preferable. To obtain such a true density, the C-axis crystallite thickness of (002) plane should be 14.0 nm or more. The spacing of (002) plane is preferably less than 0.340 nm, and more preferably in the range from 0.335 nm to 0.337 nm. The graphite may be a natural graphite or an artificial graphite.

As the non-graphitizable carbon, a non-graphitizable carbon having a spacing of (002) plane of 0.37 nm or more and having a true density of less than 1.70 $g/cm^3$ that does not show the exothermic peak at 700 deg C. or more in the differential thermal analysis (DTA) in the air is preferable.

As the anode material capable of inserting and extracting lithium, an anode material capable of inserting and extracting lithium and containing at least one of a metal element and a metalloid element as an element is cited. In case of using such an anode material, a higher energy density may be obtained. Such an anode material may be a simple substance, an alloy, or a compound of the metal element or the metalloid element; or may be a material having one or more phases thereof at least in part. In the present invention, the alloy includes an alloy containing one or more metal elements and one or more metalloid elements, in addition to an alloy including two or more metal elements. Further, the alloy may contain a non-metal element. The texture thereof may be a solid solution, a eutectic crystal (eutectic mixture), an intermetallic compound, or a texture in which two or more thereof coexist.

As the metal element or the metalloid element that composes the anode material, for example, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like capable of forming an alloy with lithium is cited. Such an element may be crystalline or amorphous.

Specially, an anode material containing a metal element or a metalloid element of Group 4B in the short period periodic table as an element is preferable. An anode material containing at least one of silicon and tin as an element is particularly preferable. Silicon and tin have the high ability to insert and extract lithium, and may provide a high energy density.

As an alloy of tin, for example, an alloy containing at least one selected from the group consisting of silicon, nickel, copper (Cu), iron, cobalt, manganese, zinc, indium, silver, titanium (Ti), germanium, bismuth, antimony (Sb), and chromium (Cr) as a second element other than tin is cited. As an alloy of silicon, for example, an alloy containing at least one selected from the group consisting of tin, nickel, copper, iron, cobalt, manganese, zinc, indium, silver, titanium, germanium, bismuth, antimony, and chromium as a second element other than silicon is cited.

As a compound of tin or a compound of silicon, for example, a compound containing oxygen (O) or carbon (C) is cited. In addition to tin or silicon, the compound may contain the foregoing second element.

It is preferable that at least one of the cathode active material layer 21B and the anode active material layer 22B further contains an ambient temperature molten salt. The concentration of the ambient temperature molten salt in the cathode active material layer 21B and the anode active material layer 22B is preferably in the range from 0.1 mass % to 5 mass %, and more preferably in the range from 0.5 mass % to 5 mass %, because the ambient temperature molten salt having the concentration in the foregoing range is free from cracks generated when the active material layer is spirally wound and mixture dropping when the active material layer is punched out with the use of a die, and provides favorable cycle characteristics. If the concentration of the ambient temperature molten salt in the active material layer is 10 mass % or more, the separation strength, the press characteristics, and the load characteristics are lowered, and thereby the cycle characteristics are lowered.

Further, if the concentration of the ambient temperature molten salt in the cathode active material layer is in the range from 0.1 mass % to 5 mass %, the gelation of the cathode mixture slurry generated when the cathode active material containing a lithium nickel composite oxide and the binder containing a vinylidene fluoride-based polymer or an acrylonitrile-based polymer are used may be prevented, and favorable cycle characteristics may be obtained.

The ambient temperature molten salt preferably contains, for example, a tertiary or quaternary ammonium salt including a tertiary or quaternary ammonium cation and an anion having a fluorine atom. This is because if the tertiary or quaternary ammonium salt is used, after-mentioned reductive decomposition of the electrolytic solution may be prevented. One of the ambient temperature molten salts may be used singly, or two or more thereof may be used by mixing. The tertiary or quaternary ammonium cation includes a cation having characteristics of the tertiary or quaternary ammonium cation.

As the quaternary ammonium cation, for example, a cation having the structure shown in the following Formula (1) is cited.

[Chemical formula 1]

In Formula (1), R1, R2, R3, and R4 represent an aliphatic group, an aromatic group, a heterocyclic group, or a group in which part of their elements is substituted with a substituent group. R1, R2, R3, and R4 may be identical with or different from each other. As the aliphatic group, for example, an alkyl group, an alkoxyl group or the like is cited. As the alkyl group, a methyl group, an ethyl group, a propyl group, a hexyl group, an octyl group or the like is cited. As a group in which part of the elements of the aliphatic group is substituted with a substituent group, for example, a methoxyethyl group is cited. As the substituent group, for example, a hydrocarbon group, a hydroxyalkyl group, an alkoxyalkyl group with a carbon number of from 1 to 10 is cited. As the aromatic group, for example, an allyl group or the like is cited. As the heterocyclic group, for example, pyrrole, pyridine, imidazole, pyrazole, benzimidazole, piperidine, pyrrolidine, carbazole, quinoline, pyrrolidinium, piperidinium, piperadinium or the like is cited.

As the cation having the structure shown in Formula (1), for example, an alkyl quaternary ammonium cation, a cation in which part of its functional groups is substituted with a hydrocarbon group with a carbon number of from 1 to 10, a hydroxyalkyl group, or an alkoxyalkyl group or the like is cited. As the alkyl quaternary ammonium cation, $(CH_3)_3R5N+$ (R5 represents an alkyl group or an alkenyl group with a carbon number of from 3 to 8) is preferable. Such a cation includes, for example, a trimethylpropylammonium cation, a trimethyloctylammonium cation, a trimethylallylammonium cation, a trimethylhexylammonium cation, and an N,N-diethyl-N-methyl-N-(2-methoxyethyl)ammonium cation.

Further, as a tertiary or quaternary ammonium cation other than the cation having the structure shown in Formula (1), a nitrogen-containing heterocyclic cation having a structure shown in one of the following Formulas (2) to (5) is cited. The nitrogen-containing heterocyclic cation means a cation that has a positive charge on a nitrogen atom composing a heterocycle as shown in Formulas (2) to (5).

[Chemical formula 2]

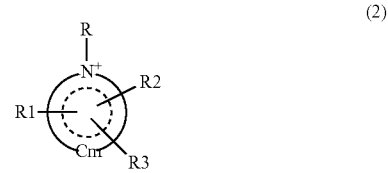

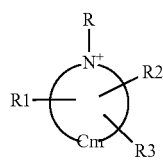

(3)

Formula (2) shows a structure having a conjugate bond, and Formula (3) shows a structure not having a conjugate bond. In Formula (2) and Formula (3), m is 4 to 5; and R1, R2, and R3 are an alkyl group, an alkoxy group, an amino group, or a nitro group with a carbon number of from 1 to 5 and may be identical with or different from each other. Further, R1, R2, and R3 may be absent. R represents a hydrogen atom or an alkyl group with a carbon atom of from 1 to 5; and the nitrogen atom is a tertiary or quaternary ammonium cation.

[Chemical formula 3]

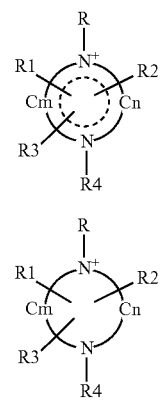

(4)

(5)

Formula (4) shows a structure having a conjugate bond, and Formula (5) shows a structure not having a conjugate bond. In Formula (4) and Formula (5), m is from 0 to 2; m+n is 3 to 4; and R1, R2, and R3 are an alkyl group, an alkoxy group, an amino group, or a nitro group with a carbon number of from 1 to 5 and may be identical with or different from each other. Further, R1, R2, and R3 may be absent. R4 represent an alkyl group with a carbon atom number of from 1 to 5; R represents a hydrogen atom or an alkyl group with a carbon atom number of from 1 to 5; and the nitrogen atom is a tertiary or quaternary ammonium cation.

As the nitrogen-containing heterocyclic cation having a structure shown in one of Formulas (2) to (5), for example, a pyrrolium cation, a pyridinium cation, an imidazolium cation, a pyrazolium cation, a benzimidazolium cation, an indolium cation, a carbazolium cation, a quinolinium cation, a pyrrolidinium cation, a piperidinium cation, a piperadinium cation, a cation in which part of their functional groups is substituted with a hydrocarbon group, a hydroxyalkyl group, or an alkoxyalkyl group with a carbon number of from 1 to 10 is cited. As such a nitrogen-containing heterocyclic cation, for example, an ethylmethylimidazolium cation and an N-methyl-N-propylpiperidinium cation is cited.

As the anion having a fluorine atom, for example, $BF_4^-$, $PF_6^-$, $C_nF_{2n+1}CO_2^-$, (n is an integer number of from 1 to 4), $C_mF_{2m+1}SO_3^-$, (m is an integer number of from 1 to 4) $(FSO_2)_2N^-$, $(CF_3SO_2)_2N^-$, $(C_2F_5SO_2)_2N^-$, $(CF_3SO_2)(C_4F_9SO_2)N^-$, $(CF_3SO_2)_3C^-$, $CF_3SO_2$—$N^-$—$COCF_3$, or $R5$-$SO_2$—$N^-$—$SO_2CF_3$ (R5 represents an aliphatic group or an aromatic group) is cited. Specially, $BF_4^-$, (F—$SO_2)_2$—$N^-$, $(CF_3$—$SO_2)_2$—$N^-$, $(C_2F_5SO_2)_2N^-$, or $(CF_3SO_2)(C_4F_9SO_2)N^-$ is preferable. $BF_4^-$, (F—$SO_2)_2$—$N^-$, or $(CF_3$—$SO_2)_2$—$N^-$ is more preferable.

As an ambient temperature molten salt composed of the cation having the structure shown in Formula (1) and the anion having a fluorine atom, an ambient temperature molten salt composed of the alkyl quaternary ammonium cation and the anion having a fluorine atom is particularly preferable. Specially, an ambient temperature molten salt in which $(CH_3)_3R5N^+$ (R5 represents an alkyl group or an alkenyl group with a carbon number of from 3 to 8) is used as the alkyl quaternary ammonium cation and $(CF_3SO_2)_2N^-$, $(C_2F_5SO_2)_2N^-$, or $(CF_3SO_2)(C_4F_9SO_2)N^-$ is used as the anion having a fluorine atom is more preferable. As such an ambient temperature molten salt, for example, trimethylpropyl ammonium.bis(trifluoromethylsulfonyl)imide, trimethyloctyl ammonium.bis(trifluoromethylsulfonyl)imide, trimethylallyl ammonium.bis(trifluoromethylsulfonyl)imide, trimethylhexyl ammonium.bis(trimethylfluorosulfonyl)imide or the like is cited.

In addition to the foregoing compounds, for example, N,N-diethyl-N-methyl-N-(2-methoxyethyl)ammonium.bis(trifluoromethylsulfonyl)imide (hereinafter referred to as DEME.TFSI), N,N-diethyl-N-methyl-N-(2-methoxyethyl) ammonium.tetrafluoroborate (hereinafter referred to as DEME_$BF_4$) or the like is cited.

As an ambient temperature molten salt composed of the nitrogen-containing heterocycle cation and the anion having a fluorine atom, for example, 1-ethyl-3-methylimidazolium.bis(trifluoromethylsulfonyl)imide (hereinafter referred to as EMI.TFSI), 1-ethyl-3-methylimidazolium.tetrafluoroborate (hereinafter referred to as EMI.$BF_4$), N-methyl-N-propylpiperidinium.bis(trifluoromethylsulfonyl) imide (hereinafter referred to as PP13.TFSI), N-methyl-N-propylpiperidinium.bis(fluorosulfonyl)imide (hereinafter referred to as PP13.FSI) or the like is cited.

The cathode active material layer 21B and the anode active material layer 22B preferably contains a lithium electrolyte salt. By adding a premixed material of the lithium electrolyte salt and the ambient temperature molten salt to the electrode mixture slurry, the lithium electrolyte salt is contained in the cathode active material layer 21B and the anode active material layer 22B. Thereby, the discharge capacity retention ratio may be improved. As such a lithium electrolyte salt, for example, lithium hexafluorophosphate (LiPF$_6$), lithium tetrafluoroborate (LiBF$_4$), lithium bis(trifluoromethanesulfonyl)imide [Li(CF$_3$SO$_2$)$_2$N], lithium bis(pentafluoroethanesulfonyl)imide [Li (C$_2$F$_5$SO$_2$)$_2$N] is cited. One of the lithium electrolyte salts may be used singly, or two or more thereof may used by mixing. The additive amount of the lithium electrolyte salt is preferably in the range from 0.2 to 1.6 mol per 1 dm$^2$ of the ambient temperature molten salt added to the cathode active material layer 21B and the anode active material layer 22B.

If necessary, the cathode active material layer 21B and the anode active material layer 22B may contain an electrical conductor and a binder. As the electrical conductor, for example, a carbon material such as graphite, carbon black, and Ketjen black is cited. One thereof may be used singly, or two or more thereof may be used by mixing. In addition to the carbon material, a metal material, a conductive polymer material or the like may be used, as long as such a material has conductivity.

As the binder, for example, a polymer containing at least one of vinylidene fluoride and acrylonitrile is preferable, since such a polymer has high stability in the battery. One of these binders may be used singly, or two or more thereof may be used by mixing.

As the polymer containing vinylidene fluoride as a main component, for example, a vinylidene fluoride-based polymer or a vinylidene fluoride copolymer is cited. As the vinylidene fluoride-based polymer, for example, polyvinylidene fluoride (PVdF) is cited. As the vinylidene fluoride copolymer, for example, a vinylidene fluoride-hexafluoropropylene copolymer, a vinylidene fluoride-tetrafluoroethylene copolymer, a vinylidene fluoride-carboxylic acid copolymer, a vinylidene fluoride-hexafluoropropylene-carboxylic acid copolymer or the like is cited.

As the polymer containing acrylonitrile as a main component, for example, an acrylonitrile-based polymer or an acrylonitrile copolymer is cited. As the acrylonitrile-based polymer, for example, polyacrylonitrile (PAN) is cited.

In case of using the cathode active material containing a lithium nickel composite oxide, the average molecular weight of the polymer containing at least one of vinylidene fluoride and acrylonitrile is preferably in the range from 0.5 to 1 million, and more preferably in the range from 0.7 to 1 million. If the cathode active material containing a lithium nickel composite oxide and the vinylidene fluoride-based polymer having the high molecular weight of 0.7 million or more are used, the degree of progress of gelation of the cathode mixture slurry is high. However, by adding the ambient temperature molten salt to the cathode mixture slurry, the gelation of the cathode mixture slurry may be totally prevented, and favorable cycle characteristics may be obtained.

The separator 23 separates the cathode 21 from the anode 22, prevents current short circuit due to contact of the both electrodes, while letting through lithium ions. The separator 23 is made of, for example, a synthetic resin porous film made of polytetrafluoroethylene, polypropylene, and polyethylene, or a porous film made of an inorganic material such as a ceramic nonwoven cloth. The separator 23 may have a structure in which two or more porous films as the foregoing porous films are layered. Specially, a porous film made of polyolefin is preferable, since such a porous film has superior short circuit preventive effect, and may improve battery safety by shutdown effect. In particular, polyethylene is preferable as a material composing the separator 23, since polyethylene may provide shutdown effect in the range from 100 deg C. to 160 deg C., and has superior electrochemical stability. Further, polypropylene is also preferable. In addition, any other resin having the chemical stability may be used by being copolymerized with polyethylene or polypropylene, or being blended therewith.

An electrolytic solution is impregnated in the separator 23. The electrolytic solution contains, for example, a solvent and an electrolyte salt dissolved in the solvent.

As the solvent, for example, a carbonate-based nonaqueous solvent such as ethylene carbonate, diethyl carbonate, ethyl methyl carbonate, propylene carbonate, dimethyl carbonate, vinylene carbonate, and fluoroethyl carbonate is cited. As other solvent, for example, 4-fluoro-1,3-dioxolane-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropylonitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, and ethylene sulfide is cited. Specially, ethylene carbonate, propylene carbonate, vinylene carbonate, dimethyl carbonate, ethyl methyl carbonate, and ethylene sulfide are preferable, since thereby superior charge and discharge capacity characteristics and superior charge and discharge cycle characteristics may be obtained.

As the electrolyte salt, for example, a lithium electrolyte salt such as lithium hexafluorophosphate ($LiPF_6$), lithium bis(pentafluoroethanesulfonyl)imide [$Li(C_2F_5SO_2)_2N$], lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide [$Li(CF_3SO_2)_2N$], lithium tris(trifluoromethanesulfonyl)methyl [$LiC(SO_2CF_3)_3$], lithium chloride (LiCl), and lithium bromide (LiBr) is cited. One of the electrolyte salts may be used singly, or two or more thereof may used by mixing.

(1-2) Method of Manufacturing Secondary Battery

The foregoing secondary battery is manufactured, for example, as follows.

First, a cathode active material, an electrical conductor, a binder, and an ambient temperature molten salt are mixed to prepare a cathode mixture, which is dispersed in a solvent such as N-methyl-2-pyrrolidone to form paste cathode mixture slurry. Subsequently, the cathode current collector 21A is coated with the cathode mixture slurry, and the solvent is volatilized. The resultant is compression-molded by a rolling press machine or the like to form the cathode active material layer 21B and form the cathode 21. The cathode mixture is prepared so that the content of the ambient temperature molten salt in the cathode active material layer 21B is in the range from 0.1 mass % to 5 mass %.

Further, an anode active material, a binder, and an ambient temperature molten salt if necessary are mixed to prepare an anode mixture, which is dispersed in a solvent such as N-methyl-2-pyrrolidone to form paste anode mixture slurry. Subsequently, the anode current collector 22A is coated with the anode mixture slurry, and the solvent is dried. The resultant is compression-molded by a rolling press machine or the like to form the anode active material layer 22B and form the anode 22.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between. An end of the cathode lead 25 is welded to the safety valve mechanism 15, and an end of the anode lead 26 is welded to the battery can 11. The spirally wound cathode 21 and the spirally wound anode 22 are sandwiched between the pair of insulating plates 12, 13, and the resultant spirally wound body is contained in the battery can 11. After the cathode 21 and the anode 22 were contained in the battery can 11, an electrolytic solution is injected into the battery can 11, and impregnated in the separator 23. After that, at the open end of the battery can 11, the battery cover 14, the safety valve mechanism 15, and the PTC device 16 are fixed by being caulked with the gasket 17. The secondary battery shown in FIG. 1 is thereby fabricated.

In the secondary battery, when charged, for example, lithium ions are extracted from the cathode active material layer 21B, and are inserted in the anode active material layer 22B through the electrolytic solution. When discharged, for example, lithium ions are extracted from the anode active material layer 22B, and are inserted in the cathode active material layer 21B through the electrolytic solution.

In general, an active material layer using, as a binder, a polymer material having polyvinylidene fluoride, polyacrylonitrile or the like as a main component is more rigid and more easily generates a crack than an active material layer using, as a binder, synthetic rubber such as styrene butadiene-based rubber. However, in this embodiment, even if the foregoing polymer material is used as a binder, the flexible cathode active material layer 21B is realized by adding the appropriate amount of the ambient temperature molten salt. Therefore, for example, even if the minimum curvature radius in the spirally wound electrode body 20 is 2.0 mm or less, a crack, separation and the like are not generated in the cathode active material layer 21B. In the result, the cathode active material layer 21B is formed more thickly on the cathode current collector 21A, and a high capacity may be obtained. In addition, by adding the ambient temperature molten salt, the lithium ion mobility in the cathode 21 is improved, and thus favorable cycle characteristics may be obtained. In particular, if the foregoing polymer material is used as a binder, a higher energy density may be obtained, and the capacity may be further increased.

Further, by adding the ambient temperature molten salt to the cathode active material layer 21B, generation of gas from the inside of the battery at high temperature is prevented, and the safety may be improved. It may result from the fact that the reaction between the cathode active material and the electrolyte is prevented since the ambient temperature molten salt forms a favorable coat on the surface of the cathode active material layer 21B.

Further, in a battery having the electrolyte containing a carbonate-based nonaqueous solvent and a lithium electrolyte salt, since the reactivity between the electrolytic solution and the active material is high, the battery generates heat and takes fire if the battery is in an unstable mode (being heated, overcharged, crushed, needle-stuck and the like). However, in this embodiment, the ambient temperature molten salt is previously contained in the cathode active material layer 21B, the abundant ambient temperature molten salt that does not generate heat is further contained in the vicinity of the interface of the cathode active material layer 21B, or the ambient temperature molten salt is inserted in the similarly highly reactive binder and modified. Thus, even if the battery is in the unstable mode, the reactivity between the active material and the organic solvent or the binder swollen with the organic solvent is prevented, and heat generation may be prevented.

Further, by adding the ambient temperature molten salt to the cathode active material layer 21B, the gelation of the cathode mixture slurry generated in the case where the cathode active material containing a lithium nickel composite oxide and the binder containing a vinylidene fluoride-based polymer or an acrylonitrile-based polymer are used may be prevented. It results from the fact that the ambient temperature molten salt selectively adhering to the surface of the cathode active material acts on the vinylidene fluoride-based polymer or the acrylonitrile-based polymer, and thereby reaction between the high-alkaline component remaining on the surface of the lithium nickel composite oxide and the vinylidene fluoride-based polymer or the polyacrylonitrile-based polymer is prevented. Accordingly, the cathode active material mainly containing the lithium nickel composite oxide and the binder mainly containing polyvinylidene fluoride, polyacrylonitrile or the like may be used at the same time. In the result, the energy density of the lithium ion secondary battery is improved, and the capacity may be increased. Though the description has been given of the effects as a result of adding the ambient temperature molten salt to the cathode active material layer 21B, similar effects may be obtained in the case that the ambient temperature molten salt is added to the anode active material layer 22B.

(2) Second Embodiment (2-1) Structure of Nonaqueous Electrolyte Secondary Battery Next, a description will be given of a structure of a secondary battery according to a second embodiment of the present invention with reference to FIGS. 3 to 8.

Figure 3:
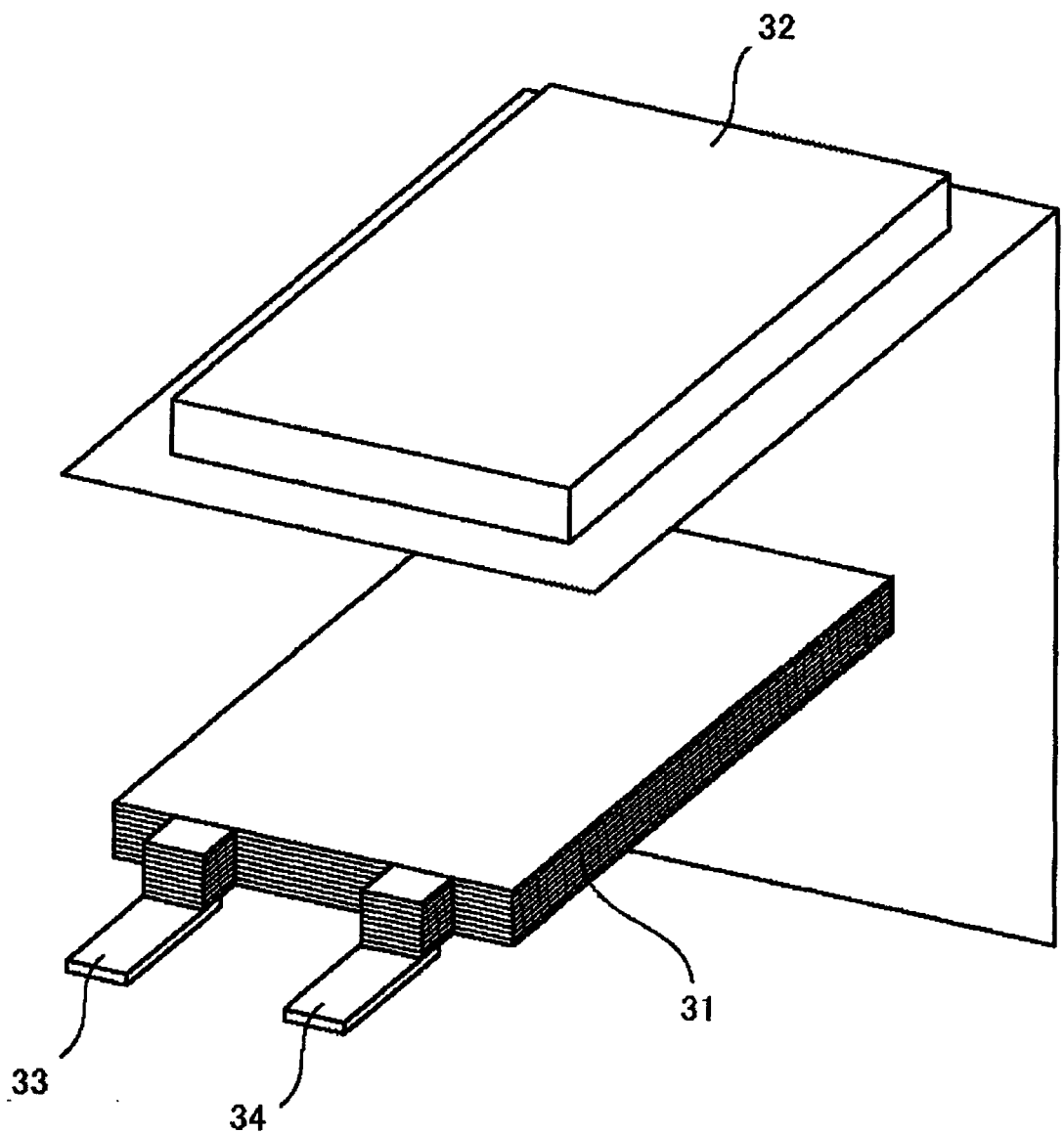
FIG. 3 An exploded perspective view showing an example of a structure of a nonaqueous electrolyte secondary battery according to a second embodiment of the present invention.

FIG. 3 is an exploded perspective view showing an example of the structure of the secondary battery according to the second embodiment of the present invention. As shown in FIG. 3, in this nonaqueous electrolyte secondary battery, a battery element 31 to which a cathode lead 33 and an anode lead 34 are attached is contained in a film package member 32. Thereby, the small, light-weight, and thin battery may be realized.

The cathode lead 33 and the anode lead 34 are respectively directed from inside to outside of the package member 32 in the same direction, for example. The cathode lead 33 and the anode lead 34 are respectively made of, for example, a metal material such as aluminum (Al), copper (Cu), nickel (Ni), and stainless, and are in the shape of a thin plate or a mesh.

The package member 32 is made of a rectangular aluminum laminated film in which, for example, a nylon film, an aluminum foil, and a polyethylene film are bonded together in this order. The package member 32 is, for example, arranged so that the polyethylene film side and the battery element 31 are opposed to each other, and the respective outer edges are contacted to each other by fusion bonding or an adhesive. Though not shown, adhesive films to protect from entering of outside air are inserted between the package member 32 and the cathode lead 33/the anode lead 34. The adhesive film is made of a material having contact characteristics to the cathode lead 33 and the anode lead 34. For example, the adhesive film is made of a polyolefin resin such as polyethylene, polypropylene, modified polyethylene, and modified polypropylene. The package member 32 may be made of a laminated film having other structure, a polymer film such as polypropylene, or a metal film, instead of the foregoing aluminum laminated film.

Figure 4:
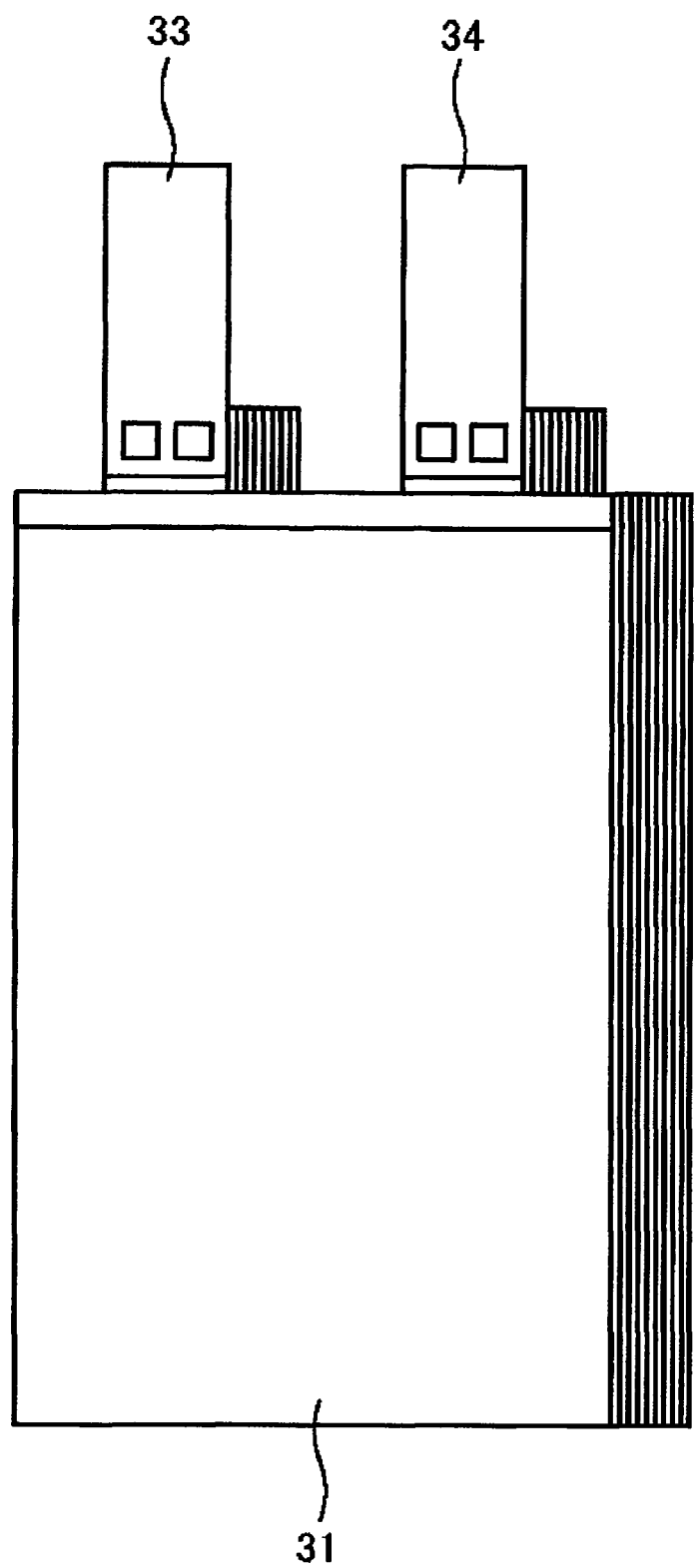
FIG. 4 A perspective view showing an example of an appearance of a battery element used for the nonaqueous electrolyte secondary battery according to the second embodiment of the present invention.
Figure 5:
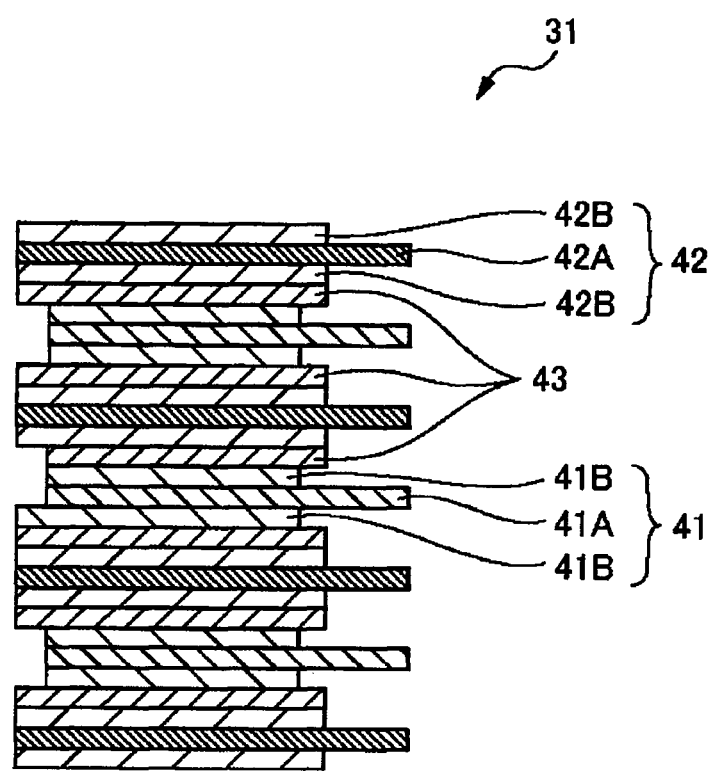
FIG. 5 A cross section showing an example of a structure of the battery element used for the nonaqueous electrolyte secondary battery according to the second embodiment of the present invention.

FIG. 4 shows a perspective view showing an example of an appearance of the battery element 31. FIG. 5 is a cross section showing an example of a structure of the battery element 31. The battery element 31 is a laminated electrode body in which a cathode 41 and an anode 42 are layered with a separator 43 in between. An electrolytic solution as a liquid electrolyte is impregnated in the separator 43.

Figure 6:
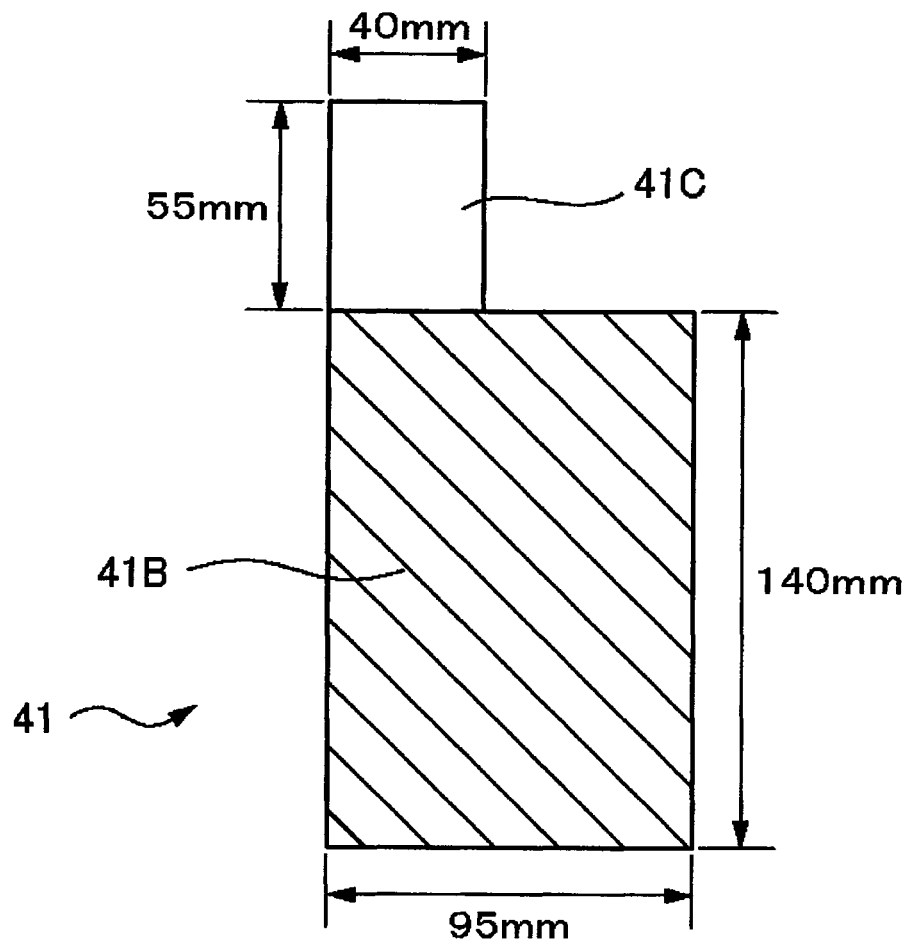
FIG. 6 A plan view showing an example of a shape of a cathode.

The cathode 41 has, for example, a structure in which a cathode mixture layer 41B is provided on the both faces of a cathode current collector 41A having a pair of faces. As shown in FIG. 6, the cathode 41 has a rectangle electrode part and a current collector exposed part 41C extending from a side of the electrode part. In the current exposed part 41C, the cathode mixture layer 41B is not provided, and the cathode current collector 41A is exposed. The current collector exposed part 41C is electrically connected to the cathode lead 33. Though not shown, the cathode mixture layer 41B may be provided on only a single face of the cathode current collector 41A. The cathode current collector 41A is made of, for example, a metal foil such as an aluminum foil.

Figure 7:
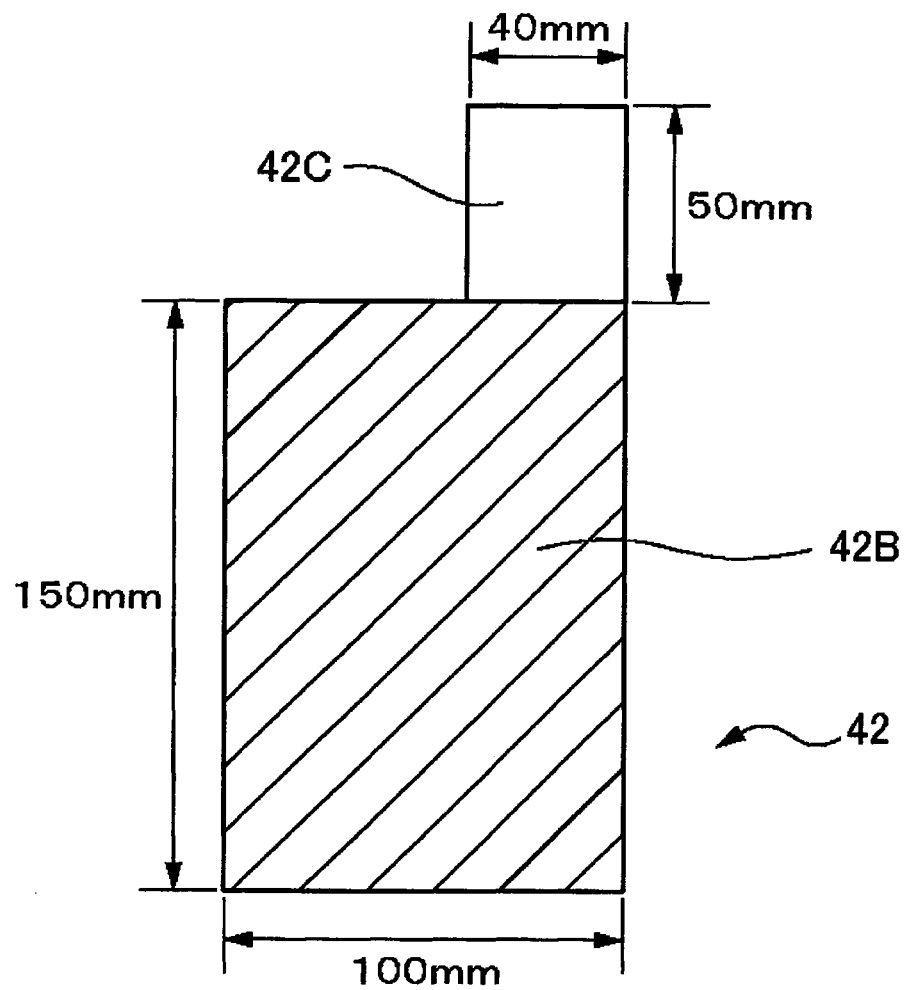
FIG. 7 A plan view showing an example of a shape of an anode.

The anode 42 has, for example, a structure in which an anode mixture layer 42B is provided on the both faces of an anode current collector 42A having a pair of faces. As shown in FIG. 7, the anode 42 has a rectangle electrode part and a current collector exposed part 42C extending from a side of the electrode part. In the current exposed part 42C, the anode mixture layer 42B is not provided, and the anode current collector 42A is exposed. The current collector exposed part 42C is electrically connected to the anode lead 34. Though not shown, the anode mixture layer 42B may be provided on only a single face of the anode current collector 42A.

Figure 8:
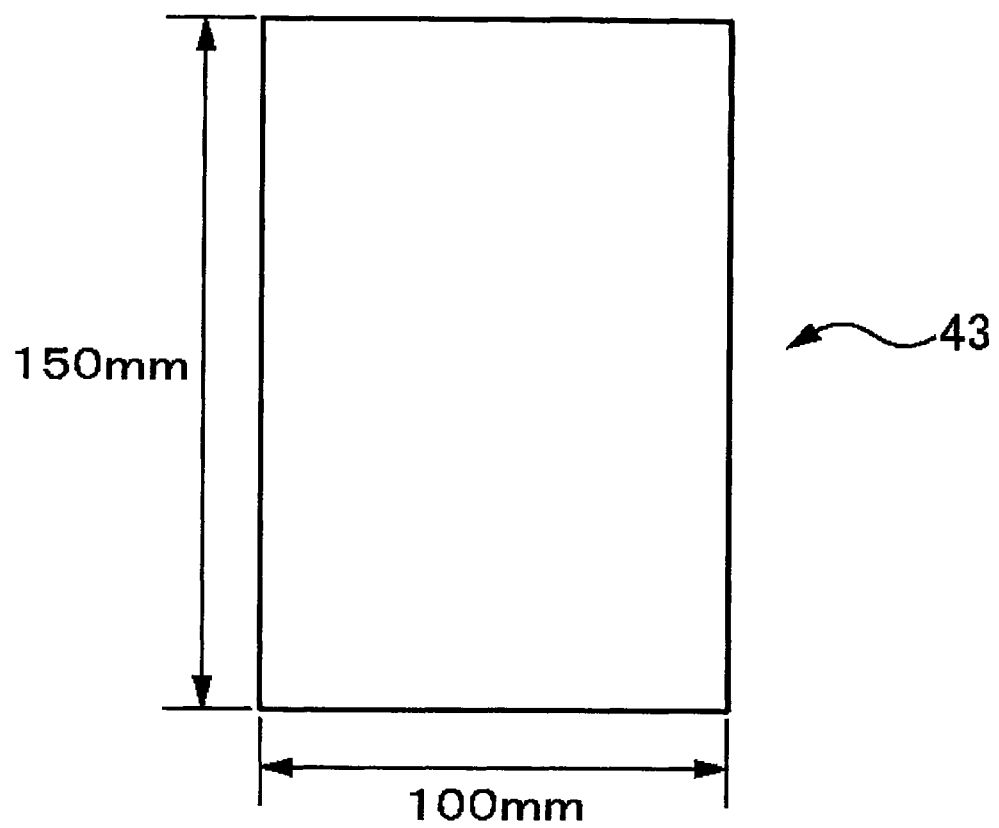
FIG. 8 A plan view showing an example of a shape of a separator.

As shown in FIG. 8, any type of the separator 43 may be used, as long as a separator is in the shape of a rectangle or the like, is electrically stable, is chemically stable to the cathode active material, the anode active material, or the solvent, and does not have electric conductivity. For example, a polymer nonwoven fabric, a porous film, or a paper-like glass/ceramics fiber may be used, or a lamination obtained by layering a plurality of these materials may be used. In particular, a porous polyolefin film is preferably used. The porous polyolefin film is also preferably used by being mixed with a heat-resisting material made of polyimide, glass/ceramics fiber or the like.

(2-2) Method of Manufacturing Nonaqueous Electrolyte Secondary Battery

The nonaqueous electrolyte secondary battery structured as above is manufactured, for example, as follows.

The cathode 41 is formed as follows. First, for example, a cathode active material, an inorganic oxide not contributing to charge and discharge, a binder, and an electrical conductor are mixed to prepare a cathode mixture. The cathode mixture is dispersed in a solvent such as N-methylpyrrolidone to form a paste cathode mixture coating material. Next, the both faces of the cathode current collector 41A are coated with the cathode mixture coating material, and the resultant is dried and pressed. Thereby, the cathode mixture layer 41B is formed. After that, the resultant is cut into the shape shown in FIG. 6 or the like to obtain the cathode 41.

The anode 42 is formed as follows. First, for example, an anode active material, a binder, and an electrical conductor are mixed to prepare an anode mixture. The anode mixture is dispersed in a solvent such as N-methylpyrrolidone to form a paste anode mixture coating material. Next, the both faces of the anode current collector 42A are coated with the anode mixture coating material, and the resultant is dried and pressed. Thereby, the anode mixture layer 42B is formed. After that, the resultant is cut into the shape shown in FIG. 7 or the like to obtain the anode 42.

The battery element 31 is formed as follows. First, a polypropylene microporous film or the like is cut into the shape shown in FIG. 8 to fabricate the separator 43. Next, a plurality of pieces of the anode 42, the cathode 41, and the separator 43 obtained as described above are layered, for example, in the order of the anode 42, the separator 43, the cathode 41 . . . the cathode 41, the separator 43, and the anode 42 as shown in FIG. 4 to fabricate the battery element.

Next, the current exposed part 41C of the cathode 41 is welded to the cathode lead 33. Similarly, the current exposed part 42C of the anode 42 is welded to the anode lead 34. Next, after the electrolytic solution is impregnated in the battery element 31, the battery element 31 is sandwiched between the package members 32, and the outer peripheral edges of the package members 32 are contacted by thermal fusion bonding or the like to enclose the battery element 31. At this time, the cathode lead 33 and the anode lead 34 are extended out of the package member 32 through a thermally fusion bonded portion, and these are used as a cathode anode terminal. Consequently, a nonaqueous electrolyte secondary battery having a targeted capacity of, for example, 1 Ah is obtained.

In the second embodiment of the present invention, effects similar to those of the foregoing first embodiment is obtained.

(3) Third Embodiment

Next, a description will be given of a third embodiment of the present invention. In a nonaqueous electrolyte secondary battery according to this embodiment, a gel electrolyte layer is used instead of the electrolytic solution as a liquid electrolyte in the foregoing secondary battery. For the elements similar to those of the foregoing second embodiment, the same symbols are affixed thereto, and the descriptions thereof are omitted.

(3-1) Structure of Nonaqueous Electrolyte Secondary Battery

Figure 9:
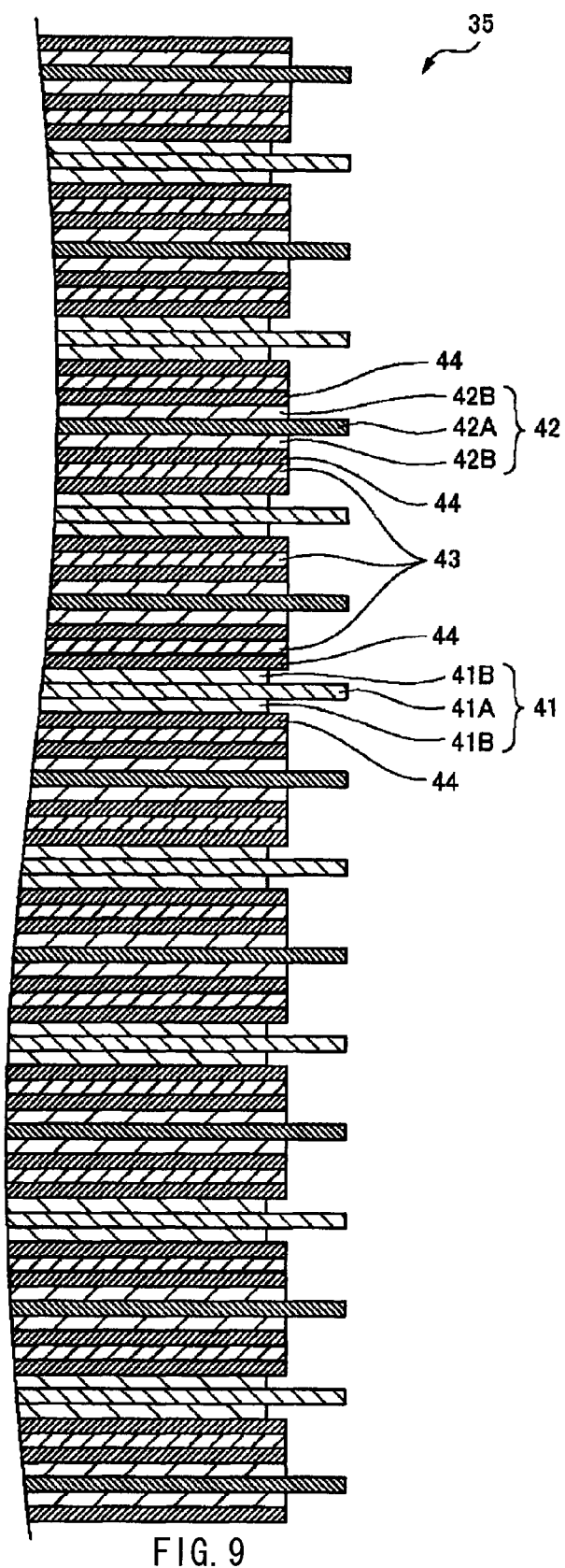
FIG. 9 A cross section showing an example of a structure of a nonaqueous electrolyte secondary battery according to a third embodiment of the present invention.

FIG. 9 is a cross section showing an example of a structure of a battery element used for this nonaqueous electrolyte secondary battery. In a battery element 35, the cathode 41 and the anode 42 are layered with the separator 43 and an electrolyte layer 44 in between.

The electrolyte layer 44 contains an electrolytic solution and a polymer compound as a holding body that holds the electrolytic solution, and is in a so-called gelatinous state. The gel electrolyte layer 44 is preferable, since a high ion conductivity may be thereby obtained and liquid leakage of the battery may be prevented. The composition of the electrolytic solution (that is, a solvent, an electrolyte salt and the like) is similar to that of the nonaqueous electrolyte secondary battery in the second embodiment.

As the polymer compound, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylate, styrene-butadiene rubber, nitrile-butadiene rubber, polystyrene, or polycarbonate is cited. In particular, in terms of electrochemical stability, polyacrylonitrile, polyvinylidene fluoride, polyhexafluoropropylene, or polyethylene oxide is preferable.

(3-2) Method of Manufacturing Nonaqueous Electrolyte Secondary Battery

The nonaqueous electrolyte secondary battery structured as above is manufactured, for example, as follows.

First, the cathode 41 and the anode 42 are respectively coated with a precursor solution containing a solvent, an electrolyte salt, a polymer compound, and a mixed solvent. The mixed solvent is volatilized to form the electrolyte layer 44. Subsequent steps are similar to those of the foregoing second embodiment, except that the cathode 41 and the anode 42 on which the electrolyte layer 44 is formed are used. Consequently, the nonaqueous electrolyte secondary battery is obtained In the third embodiment of the present invention, effects similar to those of the foregoing second embodiment is obtained.

The present invention has been described with reference to the embodiments. However, the present invention is not limited to the foregoing embodiments, and various modifications may be made. For example, in the foregoing embodiments, the descriptions have been given of the battery using lithium as an electrode reactant. However, the present invention may be also applied to the case using other alkali metal such as sodium (Na) and potassium (K); other alkali earth metal such as magnesium and calcium (Ca); or other light metal such as aluminum. At this time, the cathode active material capable of inserting and extracting the electrode reactant or the like may be selected according to the electrode reactant.

Further, in the foregoing embodiments, the descriptions have been given with the specific examples of the cylinder type secondary battery having the spirally wound structure and the lamination type secondary battery in which the plurality of cathodes and anodes are layered. However, the present invention may be similarly applied to a secondary battery having other shape such as an oval type or a polygon type secondary battery having a spirally wound structure. In addition, the present invention may be similarly applied to a secondary battery having other shape such as a coin type, a button type, a square type and a laminated film type secondary battery.

Further, in the foregoing embodiment, for the content ratio of the ambient temperature molten salt contained in the cathode or the anode active material layer in the battery of the present invention, the description has been given of its appropriate range derived from results of Examples. However, the description does not totally deny a possibility that the content ratio of the ambient temperature molten salt is out of the foregoing range. That is, the foregoing appropriate range is only the particularly preferable range to obtain the effects of the present invention. Thus, as long as the effects of the present invention are obtained, the content ratio of the ambient temperature molten salt may be slightly out of the foregoing range. Further, for example, if the ambient temperature molten salt contained in the electrode is diffused into the electrolytic solution associated with the use of the battery after manufacturing, even if the concentration of the ambient temperature molten salt in the electrode is changed, the effects of the present invention are sufficiently obtained as long as a given amount of the ambient temperature molten salt exists in the entire battery.

EXAMPLES

Specific examples of the present invention will be described in detail.

Examples 1-1 to 1-8

The cylinder type secondary batteries shown in FIGS. 1 and 2 were fabricated. First, lithium carbonate ($Li_2CO_3$) and cobalt carbonate ($COCO_3$) were mixed at a molar ratio of $Li_2CO_3$: $COCO_3$=0.5:1. The mixture was fired for 5 hours at 900 deg C. in the air to obtain lithium cobalt composite oxide ($LiCoO_2$). For the obtained $LiCoO_2$, X-ray diffraction was performed. In the result, the diffraction peak well corresponded with the peak of $LiCoO_2$ registered in JCPDS (Joint Committee of Powder Diffraction Standard) file. Next, the lithium cobalt composite oxide was pulverized into powder so that the cumulative 50% particle diameter obtained by laser diffraction method was 15 μm, which was used as a cathode active material.

Subsequently, 95 mass % of the lithium cobalt composite oxide-powder and 5 mass % of lithium carbonate powder ($Li_2CO_3$) were mixed. 94 mass % of the mixture, 3 mass % of Ketjen black as an electrical conductor, and 3 mass % of polyvinylidene fluoride (or polyacrylonitrile) as a binder were mixed. The mixture was simply added with DEME.TFSI as an ambient temperature molten salt that is a quaternary ammonium salt. After that, the resultant was dispersed in N-methyl-2-pyrrolidone as a solvent to form cathode mixture slurry. Next, the both faces of the cathode current collector 21A made of a strip-shaped aluminum foil being 15 μm thick were uniformly coated with the cathode mixture slurry, which was then sufficiently dried at 130 deg C. The resultant was compression-molded to form the cathode active material layer 21B, and thereby the cathode 21 was formed. At 130 deg C., N-methyl-2-pyrrolidone as the solvent had the steam pressure for evaporation thereof, whereas the steam pressure of DEME.TFSJ as the ambient temperature molten salt was close to 0 without limit. Therefore, N-methyl-2-pyrrolidone was totally volatilized and evaporated to disappear. Thus, only DEME.TFSI remained as a liquid in the cathode active material layer 21B. The thickness of a single face of the cathode active material layer 21B was 100 μm, and the volume density thereof was 3.52 g/cm$^3$. Further, the content ratio of the ambient temperature molten salt in the cathode active material layer 21B was changed as shown in Table 1 described later. After the cathode 21 was formed, the cathode lead 25 made of aluminum was attached to one end of the cathode current collector 21A.

Further, 90 mass % of particulate graphite powder having an average particle diameter of 25 μm as an anode active material and 10 parts by mass of polyvinylidene fluoride (PVdF) or polyacrylonitrile (PAN) as a binder were mixed. The mixture was dispersed in N-methyl-2-pyrrolidone as a solvent to obtain anode mixture slurry. After that, the both faces of the anode current collector 22A made of a strip-shaped copper foil being 10 μm thick were uniformly coated with the anode mixture slurry, which was then dried and compression-molded to form the anode active material layer 22B and form the anode 22. At that time, the thickness of a single face of the anode active material layer 22B was 90 μm, and the volume density thereof was 1.75 g/cm$^3$. After the anode 22 was formed, the anode lead 26 made of nickel was attached to one end of the anode current collector 22A.

After the cathode 21 and the anode 22 were respectively formed, the cathode 21 and the anode 22 were layered with the separator 23 made of a microporous polyethylene film being 22 μm in between. The lamination was spirally wound around a core having a diameter of 3.2 mm, and the spirally wound electrode body 20 was thereby formed. Next, the spirally wound electrode body 20 was sandwiched between the pair of insulating plates 12, 13, the anode lead 26 was welded to the battery can 11, the cathode lead 25 was welded to the safety valve mechanism 15, and the spirally wound electrode body 20 was contained in the battery can 11 made of nickel-plated iron. Subsequently, an electrolytic solution was injected into the battery can 11. The battery cover 14 was fixed to the battery can 11 by being caulked with the gasket 17. Thereby, the cylinder type secondary battery was fabricated.

At that time, as the electrolytic solution, a solution obtained by dissolving 1.0 mol/kg of lithium hexafluorophosphate as an electrolyte salt in a mixed solvent of vinylene carbonate (VC), ethylene carbonate (EC), fluoroethylene carbonate (FEC), diethyl carbonate (DEC), and propylene carbonate (PC) at a ratio of 1:30:10:49:10 was used.

As Comparative examples 1-1 and 1-2 relative to these examples, secondary batteries were fabricated in the same manner as that of Examples 1-1 to 1-8, except that the ambient temperature molten salt was not added to the cathode active material layer 21B.

For the fabricated secondary batteries of Examples 1-1 to 1-8 and Comparative examples 1-1 to 1-2, charge and discharge were performed, and the discharge capacity retention ratio was examined. At that time, charge was performed at a constant current of 0.7 C until the battery voltage reached 4.2 V, and then performed at a constant voltage of 4.2 V until the total charge time became 4 hours. Discharge was performed at a constant current of 0.5 C until the battery voltage reached 3.0 V. 1 C means a current value with which the theoretical capacity is able to be completely discharged in 1 hour. The discharge capacity retention ratio was obtained as the discharge capacity ratio at the 100th cycle to the discharge capacity at the first cycle, that is, (discharge capacity at the 100th cycle/discharge capacity at the first cycle)×100(%). The results are shown in Table 1. The content ratio of the ambient temperature molten salt in the cathode active material layer is expressed as mass % to the solid portion of the cathode mixture slurry.

TABLE 1

Ambient temperature molten salt: DEME·TFSI

| | Content ratio of ambient temperature molten salt (mass %) | Binder | Molecular weight of binder | Cathode active material layer Thickness of single face (μm) | Volume density (g/cm³) | Crack | Discharge capacity retention ratio (%) |
|---|---|---|---|---|---|---|---|
| Example 1-1 | 0.1 | PVdF | 0.75 million | 100 | 3.52 | Not present | 83 |
| Example 1-2 | 0.5 | PVdF | 0.75 million | 100 | 3.52 | Not present | 88 |
| Example 1-3 | 1.0 | PVdF | 0.75 million | 100 | 3.52 | Not present | 91 |
| Example 1-4 | 1.0 | PAN | 0.75 million | 100 | 3.52 | Not present | 81 |
| Example 1-5 | 5.0 | PVdF | 0.75 million | 100 | 3.52 | Not present | 90 |
| Example 1-6 | 10.0 | PVdF | 0.75 million | 100 | 3.52 | Not present | 81 |
| Example 1-7 | 12.0 | PVdF | 0.75 million | 100 | 3.52 | Not present | 73 |
| Example 1-8 | 18.0 | PVdF | 0.75 million | 100 | 3.52 | Not present | 61 |
| Comparative example 1-1 | 0.0 | PVdF | 0.75 million | 100 | 3.52 | Present | — |
| Comparative example 1-2 | 0.0 | PAN | 0.75 million | 100 | 3.52 | Present | — |

As shown in Table 1, in Comparative examples 1-1 to 1-2, since the flexibility of the cathode active material layer 21B was not sufficient, the cathode active material layer 21B was split when being spirally wound around the core. Meanwhile, in Examples 1-1 to 1-8, since the cathode active material layer 21B contained the ambient temperature molten salt, even if the binder made of the polymer compound such as polyvinylidene fluoride and polyacrylonitrile was used, the cathode active material layer 21B was not split and was spirally wound. In particular, it was found that polyvinylidene fluoride was used as a binder and the content ratio of the ambient temperature molten salt in the cathode active material layer was in the range from 0.5 mass % to 5 mass %, significantly favorable cycle characteristics might be obtained.

Examples 2-1 to 2-5

As Examples 2-1 to 2-5, secondary batteries having a structure similar to that of Example 1-2 were fabricated, except that the thickness of a single face of the cathode active material layer 21B was different. However, in only Example 2-2, the volume density of the cathode active material layer 21B was 3.61 g/cm³. Further, as Comparative examples 2-1 to 2-5, secondary batteries respectively having a structure similar to that of Examples 2-1 to 2-5 were fabricated, except that the ambient temperature molten salt was not contained in the cathode active material layer 21B.

For the secondary batteries of Examples 2-1 to 2-5 and Comparative examples 2-1 to 2-5, charge and discharge were performed, and the discharge capacity retention ratio was examined in the same manner as that of Example 1-2. The results are shown in Table 2.

TABLE 2

Ambient temperature molten salt: DEME·TFSI

| | Content ratio of ambient temperature molten salt (mass %) | Binder | Molecular weight of binder | Cathode active material layer Thickness of single face (μm) | Volume density (g/cm³) | Crack | Discharge capacity retention ratio (%) |
|---|---|---|---|---|---|---|---|
| Example 2-1 | 0.5 | PVdF | 0.75 million | 75 | 3.52 | Not present | 95 |
| Example 2-2 | 0.5 | PVdF | 0.75 million | 75 | 3.61 | Not present | 90 |
| Example 2-3 | 0.5 | PVdF | 0.75 million | 85 | 3.52 | Not present | 93 |
| Example 2-4 | 0.5 | PVdF | 0.75 million | 90 | 3.52 | Not present | 91 |
| Example 2-5 | 0.5 | PVdF | 0.75 million | 125 | 3.52 | Not present | 80 |
| Comparative example 2-1 | 0.0 | PVdF | 0.75 million | 75 | 3.52 | Not present | 89 |
| Comparative example 2-2 | 0.0 | PVdF | 0.75 million | 75 | 3.61 | Present | — |
| Comparative example 2-3 | 0.0 | PVdF | 0.75 million | 85 | 3.52 | Present | — |
| Comparative example 2-4 | 0.0 | PVdF | 0.75 million | 90 | 3.52 | Present | — |
| Comparative example 2-5 | 0.0 | PAN | 0.75 million | 125 | 3.52 | Present | — |

As shown in Table 2, in Comparative examples 2-1 to 2-5, since the flexibility of the cathode active material layer 21B was not sufficient, the cathode active material layer 21B was split when being spirally wound around the core. Meanwhile, in Examples 2-1 to 2-5, since the cathode active material layer 21B contained the ambient temperature molten salt, all the cathode active material layers 21B were not split and were spirally wound regardless of the thickness. Though the cathode active material layer 21B was not split in Comparative example 2-1, a higher discharge capacity retention ratio was obtained in Example 2-1 in which the ambient temperature molten salt was added. It possibly resulted from the fact that mobility of lithium ions was improved by adding the ambient temperature molten salt to the cathode active material layer 21B. Based on comparison between Example 2-1 and Example 2-2, the volume density may be a determination factor of the cycle characteristics.

Examples 3-1 to 3-11

As Examples 3-1 to 3-11, secondary batteries having a structure similar to that of Example 1-2 were fabricated, except that the type of the ambient temperature molten salt contained in the cathode active material layer 21B was different. However, in Examples 3-5 to 3-11, the ambient temperature molten salt added to the cathode active material layer was previously mixed with a lithium electrolyte salt [lithium bis(trifluoromethanesulfonyl)imide; $Li(CF_3SO_2)_2N$, lithium tetrafluoroborate; $LiBF_4$, lithium hexafluorophosphate; $LiPF_6$, or lithium bis(pentafluoroethanesulfonyl)imide: $Li(C_2F_5SO_2)_2N$]. Specifically, the cathode active material, the electrical conductor, and the binder were mixed. Further, the mixture was simply added with the ambient temperature molten salt previously mixed with the lithium electrolyte salt. After that, the resultant was dispersed in a solvent to obtain cathode mixture slurry. With the use of the cathode mixture slurry, the cathode active material layer 21B was formed. 1 mol of the lithium electrolyte salt was dissolved per 1 $dm^3$ of the ambient temperature molten salt added to the cathode active material layer 21B. For the secondary batteries of Examples 3-1 to 3-11, charge and discharge were performed, and the discharge capacity retention ratio was examined in the same manner as that of Example 1-2. The results are shown in Table 3.

As shown in Table 3, in all Examples 3-1 to 3-11, the significantly superior flexibility was shown, and all the cathode active material layers 21B were not split and were spirally wound. In particular, since $DEME.BF_4$ and PP13.TFSI that are a quaternary ammonium salt similarly to DEME.TFSI had the wide electrochemical window and the superior reduction stability, and showed the extremely favorable characteristics.

Further, in Examples 3-5 to 3-11 in which the lithium electrolyte salt was previously mixed to the ambient temperature molten salt added to the cathode active material layer 21B, the higher discharge capacity retention ratio was shown compared to Examples 3-1 to 3-4 in which the lithium electrolyte salt was not previously mixed to the ambient temperature molten salt. That is, it was found that the discharge capacity retention ratio was improved by previously mixing the lithium electrolyte salt to the ambient temperature molten salt added to the cathode active material layer 21B.

Example 4-1

As Example 4-1, a secondary battery having a structure similar to that of Example 1-3 was fabricated, except that the thickness of a single face of the cathode active material layer 21B was 75 μm, and the ambient temperature molten salt was $DEME.BF_4$. Further, as Comparative example 4-1, a secondary battery having a structure similar to that of Example 4-1 was fabricated, except that the ambient temperature molten salt was not contained in the cathode active material layer 21B, but was contained in the electrolyte. Here, 1.0 mass % of the ambient temperature molten salt to the total mass of the cathode active material layer 21B was added to the electrolyte. Further, as Comparative example 4-2, a secondary battery having a structure similar to that of Example 4-1 was fabricated, except that the ambient temperature molten salt was not contained in the cathode active material layer 21B or the electrolyte.

For the secondary batteries of Example 4-1 and Comparative examples 4-1 to 4-2, heating safety test was respectively performed. In this test, for each secondary battery, presence of gas eruption when the secondary battery was retained in the atmosphere of 140 deg C., 145 deg C., and 150 deg C. was examined. The results are shown in Table 4.

TABLE 3

Cathode active material layer: Thickness of single face•••100 μm,
Volume density•••3.52 g/cm³
Binder: PVdF (molecular weight 0.75 million)

|  | Content ratio of ambient temperature molten salt (mass %) | Ambient temperature molten salt | Content of lithium salt (mol/dm³) | Type of lithium salt | Crack | Discharge capacity retention ratio (%) |
|---|---|---|---|---|---|---|
| Example 3-1 | 0.5 | EMI•TFSI | 0.0 | $Li(CF_3SO_2)_2N$ | Not present | 80 |
| Example 3-2 | 0.5 | PP13•TFSI | 0.0 | $Li(CF_3SO_2)_2N$ | Not present | 91 |
| Example 3-3 | 0.5 | EMI•BF$_4$ | 0.0 | $Li(CF_3SO_2)_2N$ | Not present | 81 |
| Example 3-4 | 0.5 | DEME•BF$_4$ | 0.0 | $Li(CF_3SO_2)_2N$ | Not present | 90 |
| Example 3-5 | 0.5 | EMI•TFSI | 1.0 | $Li(CF_3SO_2)_2N$ | Not present | 84 |
| Example 3-6 | 0.5 | PP13•TFSI | 1.0 | $Li(CF_3SO_2)_2N$ | Not present | 93 |
| Example 3-7 | 0.5 | EMI•BF$_4$ | 1.0 | $Li(CF_3SO_2)_2N$ | Not present | 85 |
| Example 3-8 | 0.5 | DEME•BF$_4$ | 1.0 | $Li(CF_3SO_2)_2N$ | Not present | 93 |
| Example 3-9 | 0.5 | PP13•TFSI | 1.0 | $LiBF_4$ | Not present | 93 |
| Example 3-10 | 0.5 | PP13•TFSI | 1.0 | $LiPF_6$ | Not present | 92 |
| Example 3-11 | 0.5 | PP13•TFSI | 1.0 | $Li(C_2F_5SO_2)_2N$ | Not present | 93 |

TABLE 4

Cathode active material layer: Thickness of single face···75 μm,
Volume density···3.52 g/cm³
Binder: PVdF (molecular weight 0.75 million)
Ambient temperature molten salt: DEME·BF₄

| | Content ratio of ambient temperature molten salt (mass %) | Addition method of ambient temperature molten salt | Heating temperature | | |
|---|---|---|---|---|---|
| | | | 140 deg C. | 145 deg C. | 150 deg C. |
| Example 4-1 | 1.0 | Added to cathode active material | ○ | ○ | ○ |
| Comparative example 4-1 | 1.0 | Added to electrolyte | ○ | ○ | x |
| Comparative example 4-2 | 0.0 | Not added | ○ | x | x |

○ ··· not combusted,
x ··· combusted

As shown in Table 4, in this example, since the ambient temperature molten salt was contained in the cathode active material layer 21B, it was confirmed that the secondary battery in this example had the sufficient heating safety. It may be resulted from the fact that the reactivity between the active material and the electrolyte was prevented by thinly coating the surface of the cathode active material with the ambient temperature molten salt in the course of drying and volatilizing the solvent.

Examples 5-1 to 5-5

As Examples 5-1 to 5-5, secondary batteries were fabricated in the same manner as that of Example 1-1, except that the ambient temperature molten salt was contained in the anode active material layer 22B instead of the cathode active material layer 21B. However, the content ratio of the ambient temperature molten salt in the anode active material layer 22B was changed as shown in Table 5 described later. Further, as Comparative example 5-1, a secondary battery was fabricated in the same manner as that of Examples 5-1 to 5-5, except that the ambient temperature molten salt was not added to the anode active material layer 22B. For these secondary batteries, charge and discharge were performed, and the discharge capacity retention ratio was examined in the same manner as that of Examples 1-1 to 1-8. The results are shown in Table 5. The content ratio of the ambient temperature molten salt in the anode active material layer is expressed as mass % to the solid portion of the anode mixture slurry.

As shown in Table 5, in Comparative example 5-1, since the flexibility of the anode active material layer 22B was not sufficient, a crack was generated in the anode active material layer 22B when being spirally wound around the core. Meanwhile, in Examples 5-1 to 5-5, since the anode active material layer 22B contained the ambient temperature molten salt, a crack was not generated in the anode active material layer 22B and the anode active material layer 22B was spirally wound even if the binder made of polyvinylidene fluoride was used. In particular, it was found that if polyvinylidene fluoride was used as a binder and the content ratio of the ambient temperature molten salt in the anode active material layer was in the range from 0.5 mass % to 5 mass %, a significantly favorable discharge capacity retention ratio might be obtained.

Examples 6-1 to 6-5

As Examples 6-1 to 6-5, secondary batteries having a structure similar to that of Example 5-2 were fabricated, except that the thickness of a single face of the anode active material layer 22B was different. However, in only Example 6-2, the volume density of the anode active material layer 22B was 1.85 g/cm³. Further, as Comparative examples 6-1 to 6-5 to these examples, secondary batteries respectively having a structure similar to that of Examples 6-1 to 6-5 were fabricated, except that the ambient temperature molten salt was not contained in the anode active material layer 22B.

For the secondary batteries of Examples 6-1 to 6-5 and Comparative examples 6-1 to 6-5, charge and discharge were performed, and the discharge capacity retention ratio was examined in the same manner as that of Example 1-2. The results are shown in Table 6.

TABLE 5

Ambient temperature molten salt: DEME·TFSI

| | Content ratio of ambient temperature molten salt (mass %) | Binder | Molecular weight of binder | Anode active material layer | | | Discharge capacity retention ratio (%) |
|---|---|---|---|---|---|---|---|
| | | | | Thickness of single face (μm) | Volume density (g/cm³) | Crack | |
| Example 5-1 | 0.1 | PVdF | 0.75 million | 90 | 1.75 | Not present | 82 |
| Example 5-2 | 0.5 | PVdF | 0.75 million | 90 | 1.75 | Not present | 89 |
| Example 5-3 | 1.0 | PVdF | 0.75 million | 90 | 1.75 | Not present | 93 |
| Example 5-4 | 5.0 | PVdF | 0.75 million | 90 | 1.75 | Not present | 90 |
| Example 5-5 | 10.0 | PVdF | 0.75 million | 90 | 1.75 | Not present | 86 |
| Comparative example 5-1 | 0.0 | PVdF | 0.75 million | 90 | 1.75 | Present | 77 |

TABLE 6

Ambient temperature molten salt: DEME•TFSI

| | Content ratio of ambient temperature molten salt (mass %) | Binder | Molecular weight of binder | Anode active material layer Thickness of single face (μm) | Volume density (g/cm$^3$) | Crack | Discharge capacity retention ratio (%) |
|---|---|---|---|---|---|---|---|
| Example 6-1 | 0.5 | PVdF | 0.75 million | 65 | 1.75 | Not present | 95 |
| Example 6-2 | 0.5 | PVdF | 0.75 million | 65 | 1.85 | Not present | 89 |
| Example 6-3 | 0.5 | PVdF | 0.75 million | 75 | 1.75 | Not present | 92 |
| Example 6-4 | 0.5 | PVdF | 0.75 million | 80 | 1.75 | Not present | 90 |
| Example 6-5 | 0.5 | PVdF | 0.75 million | 115 | 1.75 | Not present | 79 |
| Comparative example 6-1 | 0.0 | PVdF | 0.75 million | 65 | 1.75 | Not present | 84 |
| Comparative example 6-2 | 0.0 | PVdF | 0.75 million | 65 | 1.85 | Present | 81 |
| Comparative example 6-3 | 0.0 | PVdF | 0.75 million | 75 | 1.75 | Not present | 82 |
| Comparative example 6-4 | 0.0 | PVdF | 0.75 million | 80 | 1.75 | Not present | 79 |
| Comparative example 6-5 | 0.0 | PVdF | 0.75 million | 115 | 1.75 | Present | 62 |

As shown in Table 6, based on respective comparison between Examples 6-1 to 6-5 and Comparative examples 6-1 to 6-5, if the ambient temperature molten salt was contained in the anode active material layer 22B, the discharge capacity retention ratio was improved.

Examples 7-1 to 7-11

As Examples 7-1 to 7-11, secondary batteries having a structure similar to that of Example 6-5 were fabricated, except that the type of the ambient temperature molten salt contained in the anode active material layer 22B was different. However, in Examples 7-5 to 7-11, the ambient temperature molten salt added to the anode active material layer 22B was previously mixed with a lithium electrolyte salt [lithium bis(trifluoromethanesulfonyl)imide; Li(CF$_3$SO$_2$)$_2$N, lithium tetrafluoroborate; LiBF$_4$, lithium hexafluorophosphate; LiPF$_6$, or lithium bis(pentafluoroethanesulfonyl)imide; Li(C$_2$F$_5$SO$_2$)$_2$N]. Specifically, the anode active material and the binder were mixed. Further, the mixture was simply added with the ambient temperature molten salt previously mixed with the lithium electrolyte salt. After that, the resultant was dispersed in a solvent to prepare anode mixture slurry. With the use of the anode mixture slurry, the anode active material layer 22B was formed. 1 mol of the lithium salt was dissolved per 1 dm$^3$ of the ambient temperature molten salt added to the anode active material layer 22B. For the secondary batteries of Examples 7-1 to 7-11, charge and discharge were performed, and the discharge capacity retention ratio was examined in the same manner as that of Example 1-2. The results are shown in Table 7.

TABLE 7

Anode active material layer: Thickness of single face•••115 μm, Volume density•••1.75 g/cm$^3$
Binder: PVdF (molecular weight 0.75 million)

| | Content ratio of ambient temperature molten salt (mass %) | Ambient temperature molten salt | Content of lithium salt (mol/dm$^3$) | Type of lithium salt | Crack | Discharge capacity retention ratio (%) |
|---|---|---|---|---|---|---|
| Example 7-1 | 0.5 | EMI•TFSI | 0.0 | Li(CF$_3$SO$_2$)$_2$N | Not present | 72 |
| Example 7-2 | 0.5 | PP13•TFSI | 0.0 | Li(CF$_3$SO$_2$)$_2$N | Not present | 81 |
| Example 7-3 | 0.5 | EMI•BF$_4$ | 0.0 | Li(CF$_3$SO$_2$)$_2$N | Not present | 72 |
| Example 7-4 | 0.5 | DEME•BF$_4$ | 0.0 | Li(CF$_3$SO$_2$)$_2$N | Not present | 79 |
| Example 7-5 | 0.5 | EMI•TFSI | 1.0 | Li(CF$_3$SO$_2$)$_2$N | Not present | 82 |
| Example 7-6 | 0.5 | PP13•TFSI | 1.0 | Li(CF$_3$SO$_2$)$_2$N | Not present | 92 |
| Example 7-7 | 0.5 | EMI•BF$_4$ | 1.0 | Li(CF$_3$SO$_2$)$_2$N | Not present | 81 |
| Example 7-8 | 0.5 | DEME•BF$_4$ | 1.0 | Li(CF$_3$SO$_2$)$_2$N | Not present | 89 |
| Example 7-9 | 0.5 | PP13•TFSI | 1.0 | LiBF$_4$ | Not present | 90 |
| Example 7-10 | 0.5 | PP13•TFSI | 1.0 | LiPF$_6$ | Not present | 89 |
| Example 7-11 | 0.5 | PP13•TFSI | 1.0 | Li(C$_2$F$_5$SO$_2$)$_2$N | Not present | 91 |

As shown in Table 7, in all Examples 7-1 to 7-11, the significantly superior flexibility was shown, and all the anode active material layers 22B were not split and were spirally wound. In particular, DEME.BF$_4$ and PP13.TFSI that are a quaternary ammonium salt similarly to DEME.TFSI had the wide electrochemical window and the superior reduction stability, and thus showed the extremely favorable characteristics.

Further, in Examples 7-5 to 7-11 in which the lithium electrolyte salt was previously mixed to the ambient temperature molten salt added to the anode active material layer 22B, the higher discharge capacity retention ratio was shown compared to Examples 7-1 to 7-4 in which the lithium electrolyte salt was not previously mixed to the ambient temperature molten salt. That is, it was found that the discharge capacity retention ratio was improved by previously mixing the lithium electrolyte salt to the ambient temperature molten salt added to the anode active material layer 22B.

Example 8-1

As Example 8-1, a secondary battery having a structure similar to that of Example 5-3 was fabricated, except that the thickness of a single face of the anode active material layer 22B was 65 μm. Further, as Comparative example 8-1, a secondary battery having a structure similar to that of Example 8-1 was fabricated, except that the ambient temperature molten salt was not contained in the anode active material layer 22B, but in the electrolyte. Here, 1.0 mass % of the ambient temperature molten salt to the total mass of the anode active material layer 22B was added to the electrolyte. Further, as Comparative example 8-2, a secondary battery having a structure similar to that of Example 8-1 was fabricated, except that the ambient temperature molten salt was not contained in the anode active material layer 22B or the electrolyte.

For the secondary batteries of Example 8-1 and Comparative examples 8-1 to 8-2, heating safety test was respectively performed. In this test, for each secondary battery, presence of gas eruption when the secondary battery was retained in the atmosphere at 140 deg C., 145 deg C., and 150 deg C. was examined. The results are shown in Table 8.

Examples 9-1 to 9-7

As Examples 9-1 to 9-7, secondary batteries having a structure similar to that of Example 1-2 were fabricated, except that the content ratio of the ambient temperature molten salt and the type of the binder were changed as shown in Table 9, and the composition of the cathode mixture slurry was changed. The cathode mixture slurry was prepared as follows. Lithium nickel composite oxide ($LiNi_{0.8}Co_{0.2}O_2$) was pulverized into powder in which the cumulative 50% particle diameter obtained by laser diffraction method was 15 μm, which was used as a cathode active material. Subsequently, 94 mass % of the lithium nickel composite oxide, 3 mass % of Ketjen black as an electrical conductor, and 3 mass % of polyvinylidene fluoride as a binder were mixed. Further, the mixture was added with DEME.TFSI as an ambient temperature molten salt. After that, the resultant was dispersed in N-methyl-2-pyrrolidone as a solvent to form cathode mixture slurry.

Further, as Comparative examples 9-1 to 9-4, secondary batteries respectively having a structure similar to that of Examples 9-1 to 9-9 were fabricated, except that the ambient temperature molten salt was not contained in the cathode active material layer 21B.

For the secondary batteries of Examples 9-1 to 9-9 and Comparative examples 9-1 to 9-4, the properties of the cathode mixture slurry (slurry aspect and presence of coating) and the properties of the cathode (electrode state and separation characteristics) were evaluated. Charge and discharge were performed and the discharge capacity retention ratio was examined in the same manner as that of Example 1-2. The results are shown in Table 9.

TABLE 8

Anode active material layer: Thickness of single face•••65 μm,
Volume density•••1.75 g/cm³
Binder: PVdF (molecular weight 0.75 million)
Ambient temperature molten salt: DEME•TFSI

| | Content ratio of ambient temperature molten salt (mass %) | Addition method of ambient temperature molten salt | Heating temperature | | |
|---|---|---|---|---|---|
| | | | 140 deg C. | 145 deg C. | 150 deg C. |
| Example 8-1 | 1.0 | Added to anode active material | o | o | o |
| Comparative example 8-1 | 1.0 | Added to electrolyte | o | o | x |
| Comparative example 8-2 | 0.0 | Not added | o | x | x | o ••• not combusted,
x ••• combusted

As shown in Table 8, in this example, since the ambient temperature molten salt was contained in the anode active material layer 22B, it was confirmed that the secondary battery in this example had the sufficient heating safety. It may be resulted from the fact that the reactivity between the active material and the electrolyte was prevented by thinly coating the surface of the anode active material with the ambient temperature molten salt.

Here, the slurry aspect and the presence of coating were examined just before coating (60 to 120 minutes after preparation). Further, the separation characteristics were expressed as the relative ratio of a measured value of a load obtained by attaching a tape to a coating layer with the use of Autograph DCS-500 (made by Shimadzu Corporation) and pulling the tape in the direction of 180 degrees at 50 mm/min (where the separation characteristics of Example 9-3 was 1).

TABLE 9

Ambient temperature molten salt: DEME•TFSI

|  | Content ratio of ambient temperature molten salt (mass %) | Binder | Molecular weight | Slurry aspect | Presence of coating | Electrode state | Separation characteristics (relative ratio) | Discharge capacity retention ratio (%) |
|---|---|---|---|---|---|---|---|---|
| Example 9-1 | 0.05 | PVdF | 0.75 | Lowering of fluidity | ○ | ○ | 1.1 | 91.6 |
| Example 9-2 | 0.10 | PVdF | 0.75 | Preferable | ○ | ○ | 1.1 | 91.8 |
| Example 9-3 | 0.50 | PVdF | 0.75 | Preferable | ○ | ○ | 1.0 | 92.0 |
| Example 9-4 | 2.00 | PVdF | 0.75 | Preferable | ○ | ○ | 0.9 | 93.5 |
| Example 9-5 | 5.00 | PVdF | 0.75 | Preferable | ○ | ○ | 0.8 | 92.9 |
| Example 9-6 | 8.00 | PVdF | 0.75 | Preferable | ○ | ○ | 0.3 | 73.6 |
| Example 9-7 | 0.50 | PVdF-CTFE | 0.75 | Preferable | ○ | ○ | 0.8 | 66.8 |
| Example 9-8 | 0.50 | PAN | 0.75 | Preferable | ○ | ○ | 0.6 | 67.5 |
| Example 9-9 | 0.50 | PVdF/PAN (50/50) | 0.75 | Preferable | ○ | ○ | 0.7 | 74.2 |
| Comparative example 9-1 | 0.00 | PVdF | 0.75 | Gelation | x | — | — | — |
| Comparative example 9-2 | 0.00 | PVdF-CTFE | 0.75 | Lowering of fluidity | x | x | 0.2 | 8.2 |
| Comparative example 9-3 | 0.00 | PAN | 0.75 | Lowering of fluidity | x | x | 0.1 | 9.3 |
| Comparative example 9-4 | 0.00 | PVdF/PAN (50/50) | 0.75 | Lowering of fluidity | x | x | 0.2 | 10.5 |

○ ••• practicable,
x ••• not practicable

As shown in Table 9, in Comparative examples 9-1 to 9-4 in which the ambient temperature molten salt was not added to the cathode active material layer 21B, the viscosity was largely increased during or after agitating the cathode mixture slurry. The PVdF-CTFE copolymer did not totally lose the fluidity, but it was difficult to form a uniform electrode. Meanwhile, in Examples 9-1 to 9-9, since the cathode active material layer 21B contained the ambient temperature molten salt, gelation of the cathode mixture slurry was prevented. That is, it was found that the gelation of the cathode mixture slurry might be prevented by adding the ambient temperature molten salt to the cathode active material layer.

Further, in Example 9-1 in which the content ratio of the ambient temperature molten salt in the cathode active material layer 21B was 0.05 mass %, the fluidity of the cathode mixture slurry was lowered. Further, in Example 9-6 in which the content ratio of the ambient temperature molten salt in the cathode active material layer 21B was 8 mass %, the separation characteristics were lowered down to 0.3 (relative ratio). Accordingly, it was found that if the amount of the ambient temperature molten salt in the cathode active material layer was small, effects to prevent the gelation of the cathode mixture slurry became weak. It was also found that if the amount of the ambient temperature molten salt in the cathode active material layer was excessively large, the separation characteristics were lowered. Further, it was found that if the content of the ambient temperature molten salt was in the range from 0.1 mass % to 5 mass %, the favorable cathode mixture slurry was obtained and the high cycle characteristics were shown.

Examples 10-1 to 10-4

As Examples 10-1 to 10-4, secondary batteries having a structure similar to that of Example 9-3 were fabricated, except that the average molecular weight of the binder was different. Further, as Comparative examples 10-1 to 10-4 relative to Examples 10-1 to 10-4, secondary batteries respectively having a structure similar to that of Examples 10-1 to 10-4 were fabricated, except that the ambient temperature molten salt was not contained in the cathode active material layer 21B.

For the secondary batteries of Examples 10-1 to 10-4 and Comparative examples 10-1 to 10-4, the properties of the cathode mixture slurry (slurry aspect and presence of coating) and the cathode state (electrode state and separation characteristics) were evaluated in the same manner as that of Example 9-3. Charge and discharge were performed and the discharge capacity retention ratio was examined in the same manner as that of Example 1-2. The results are shown in Table 10.

TABLE 10

Ambient temperature molten salt: DEME•TFSI

|  | Content ratio of ambient temperature molten salt (mass %) | Binder | Molecular weight | Slurry aspect | Presence of coating | Electrode state | Separation characteristics (relative ratio) | Discharge capacity retention ratio (%) |
|---|---|---|---|---|---|---|---|---|
| Example 10-1 | 0.5 | PVdF | 0.3 million | Preferable | ○ | ○ | 0.30 | 64.5 |
| Example 10-2 | 0.5 | PVdF | 0.5 million | Preferable | ○ | ○ | 0.70 | 82.7 |
| Example 10-3 | 0.5 | PVdF | 0.85 million | Preferable | ○ | ○ | 1.30 | 94.7 |
| Example 10-4 | 0.5 | PVdF | 1 million | Preferable | ○ | ○ | 2.00 | 96.0 |
| Comparative example 10-1 | 0.0 | PVdF | 0.3 million | Lowering of fluidity | x | x | 0.01 | 0.0 |

TABLE 10-continued

Ambient temperature molten salt: DEME•TFSI

| | Content ratio of ambient temperature molten salt (mass %) | Binder | Molecular weight | Slurry aspect | Presence of coating | Electrode state | Separation characteristics (relative ratio) | Discharge capacity retention ratio (%) |
|---|---|---|---|---|---|---|---|---|
| Comparative example 10-2 | 0.0 | PVdF | 0.5 million | Lowering of fluidity | x | x | 0.01 | 0.0 |
| Comparative example 10-3 | 0.0 | PVdF | 0.85 million | Gelation | x | — | — | — |
| Comparative example 10-4 | 0.0 | PVdF | 1 million | Gelation | x | — | — | — | o ••• practicable,
x ••• not practicable

As shown in Table 10, in Comparative examples 10-1 to 10-4 in which the ambient temperature molten salt was not added to the cathode active material layer 21B, the viscosity was largely increased during or after agitating the cathode mixture slurry. Meanwhile, in Examples 10-1 to 10-4, since the cathode active material layer 21B contained the ambient temperature molten salt, gelation of the cathode mixture slurry was prevented.

Further, in Examples 10-2 to 10-4 in which the binder made of polyvinylidene fluoride having a molecular weight of from 0.5 million to 1 million was used, gelation of the cathode mixture slurry might be prevented and the high discharge capacity retention ratio was shown. That is, the following was found. In the case where the binder containing polyvinylidene fluoride having a high molecular weight of 0.7 million or more was used together with the cathode active material containing the lithium nickel composite oxide, gelation of the cathode mixture slurry easily proceeds in general. However, the gelation of the cathode mixture slurry might be totally prevented by adding the ambient temperature molten salt to the cathode active material layer, and the favorable cycle characteristics were shown.

Examples 11-1 to 11-4

As Examples 11-1 to 11-4, secondary batteries having a structure similar to that of Example 9-3 were fabricated, except that the type of the ambient temperature molten salt contained in the cathode active material layer 21B was different. For the secondary batteries of Examples 11-1 to 11-4, the properties of the cathode mixture slurry and the cathode were evaluated in the same manner as that of Example 9-3. Charge and discharge were performed and the discharge capacity retention ratio was examined in the same manner as that of Example 1-2. The results are shown in Table 11.

TABLE 11

Binder: PVdF (molecular weight 0.75 million)

| | Content ratio of ambient temperature molten salt (mass %) | Ambient temperature molten salt | Slurry aspect | Presence of coating | Electrode state | Separation characteristics (relative ratio) | Discharge capacity retention ratio (%) |
|---|---|---|---|---|---|---|---|
| Example 11-1 | 0.5 | EMI•TFSI | Preferable | o | o | 1 | 83.1 |
| Example 11-2 | 0.5 | PP13•TFSI | Preferable | o | o | 1 | 93.2 |
| Example 11-3 | 0.5 | EMI•BF$_4$ | Preferable | o | o | 1 | 83.9 |
| Example 11-4 | 0.5 | EMI•FSI | Preferable | o | o | 1 | 85.0 | o ••• practicable,
x ••• not practicable

As shown in Table 11, in Examples 11-1 to 11-4, gelation of the cathode mixture slurry might be totally prevented, regardless of the type of the ambient temperature molten salt. In particular, as shown in Example 11-2, PP13.TFSI that is a quaternary ammonium salt similar to DEME.TFSI had the wide electrochemical window and the superior reduction stability, and thus showed the extremely favorable characteristics. That is, it was found that the quaternary ammonium salt was preferably used as an ambient temperature molten salt.

Examples 12-1 to 12-5

The lamination type secondary batteries shown in FIG. 3 were fabricated. First, lithium carbonate ($Li_2CO_3$) and cobalt carbonate ($CoCO_3$) were mixed at a molar ratio of $Li_2CO_3$:$CoCO_3$=0.5:1. The mixture was fired for 5 hours at 900 deg C. in the air to obtain lithium cobalt composite oxide ($LiCoO_2$). For the obtained $LiCoO_2$, X-ray diffraction was performed. In the result, the diffraction peak well corresponded with the peak of $LiCoO_2$ registered in JCPDS (Joint Committee of Powder Diffraction Standard) file. Next, the lithium cobalt composite oxide was pulverized into powder in which the accumulated 50% particle diameter obtained by laser diffraction method was 15 μm, which was used as a cathode active material.

Subsequently, 95 mass % of the lithium cobalt composite oxide powder and 5 mass % of lithium carbonate powder ($Li_2CO_3$) were mixed. 94 mass % of the mixture, 3 mass % of Ketjen black as an electrical conductor, and 3 mass % of polyvinylidene fluoride as a binder were mixed. The mixture was simply added with DEME.TFSI as an ambient temperature molten salt that is a quaternary ammonium salt. After that, the resultant was dispersed in N-methyl-2-pyrrolidone as a solvent to form cathode mixture slurry. The content ratio of the ambient temperature molten salt in the cathode active material layer was changed as shown in Table 12 described later.

Next, the both faces of the cathode current collector made of a strip-shaped aluminum foil being 15 μm thick were uniformly coated with the cathode mixture slurry, which was then sufficiently dried at 130 deg C. After that, the resultant was compression-molded to form the cathode active material layer, and thereby the cathode was formed. The resultant was cut into the shape shown in FIG. 6 to obtain the cathode.

At 130 deg C., N-methyl-2-pyrrolidone as the solvent had the steam pressure for evaporation thereof, whereas the steam pressure of DEME.TFSI as the ambient temperature molten salt was close to 0 without limit. Therefore, N-methyl-2-pyrrolidone was totally volatilized and evaporated to disappear. Thus, only DEME.TFSI remained as a liquid in the cathode active material layer.

Further, 90 mass % of particulate graphite powder having an average particle diameter of 25 μm as an anode active material and 10 parts by mass of polyvinylidene fluoride (PVdF) as a binder were added, and 0.2% parts by mass of DEME.TFSI as the ambient temperature molten salt that is a quaternary ammonium salt was added to the active material. After that, the resultant was dispersed in N-methyl-2-pyrrolidone as a solvent to obtain anode mixture slurry. After that, the both faces of the anode current collector made of a strip-shaped copper foil being 10 μm thick were uniformly coated with the anode mixture slurry, which was then dried and compression-molded to form the anode active material layer and form the anode. The resultant was cut into the shape shown in FIG. 7 to obtain the anode. The additive amount of the ambient temperature molten salt added to the anode mixture was fixed.

The battery element was formed as follows. First, a polypropylene microporous film being 25 μm thick was cut into the shape shown in FIG. 8, which was used as a separator. Next, 4 pieces of the anode, 3 pieces of the cathode, and 6 pieces of the separator obtained as above were layered in the order of the anode, the separator, the cathode, the separator . . . , the cathode, the separator, and the anode as shown in FIG. 5. Thereby, a battery element including 6 units of the basic lamination unit composed of the cathode mixture layer, the separator, and the anode mixture layer was formed. The uppermost layer and the lowermost layer of the battery element were the anode mixture layers, but such portions were not opposed to the cathode, and thus such sections did not contribute to battery reaction. In addition, when the lamination was made, the relative position between the anode and the cathode was adjusted so that the projection plane of the cathode mixture layer was set in a position inside of the projection plane of the anode mixture layer seen from the lamination direction. The capacity was about 1000 mAh.

Next, as shown in FIG. 4, 3 pieces of the cathode current collector exposed part of the cathode were ultrasonically welded to an aluminum current collector tub concurrently. Similarly, 4 pieces of the anode current collector exposed part of the anode were ultrasonically welded to a nickel current collector tub concurrently. Next, as a nonaqueous electrolytic solution, a solution obtained by dissolving 1 mol/dm$^3$ of $LiPF_6$ in a mixed solvent of ethylene carbonate (EC), ethyl-methyl carbonate (EMC), and dimethyl carbonate (DMC) (mixture ratio 4:2:4) was prepared. The nonaqueous electrolytic solution was impregnated in the battery element.

After that, by using a package material made of an aluminum laminated film composed of a resin layer, an aluminum layer, and a resin layer, thermally fusion-bonded the opening thereof under the reduced pressure to seal the battery element. At that time, a cathode and anode leads were extended out of the package material through a thermally fusion bonded part, and were used as a cathode and anode terminals. Consequently, a targeted secondary battery was obtained. Further, as Comparative example 12-1, a secondary battery having a structure similar to that of Examples 12-1 to 12-5 was fabricated, except that the ambient temperature molten salt was not contained in the cathode active material layer.

For the fabricated secondary batteries of Examples 12-1 to 12-5 and Comparative example 12-1, charge and discharge were performed, and the discharge capacity retention ratio was examined. At that time, charge was performed at a constant current of 0.7 C until the battery voltage reached 4.2 V, and then performed at a constant voltage of 4.2 V until the total charge time became 4 hours. Discharge was performed at a constant current of 0.5 C until the battery voltage reached 3.0 V. The results are shown in Table 12.

Here, 1 C means a current value with which the theoretical capacity is completely discharged in 1 hour. The discharge capacity retention ratio was obtained as the discharge capacity ratio at the 100th cycle to the discharge capacity at the first cycle, that is, (discharge capacity at the 100th cycle/discharge capacity at the first cycle)×100(%). The content ratio of the ambient temperature molten salt in the cathode active material layer is expressed as mass % to the solid portion of the cathode mixture slurry.

TABLE 12

| | Content ratio of ambient temperature molten salt to cathode solid portion (mass %) | Ambient temperature molten salt | Amount of lithium salt to ambient temperature molten salt (mol/dm$^3$) | Retention of cathode mixture | Battery capacity (mAh) | Retention ratio after 100th cycle (%) |
|---|---|---|---|---|---|---|
| Example 12-1 | 0.1 | DEME•TFSI | 0 | ○ | 1007 | 86 |
| Example 12-2 | 0.5 | DEME•TFSI | 0 | ⊚ | 1004 | 89 |
| Example 12-3 | 1.0 | DEME•TFSI | 0 | ⊚ | 1011 | 92 |
| Example 12-4 | 5.0 | DEME•TFSI | 0 | ⊚ | 1005 | 91 |
| Example 12-5 | 10.0 | DEME•TFSI | 0 | ○ | 1001 | 76 |
| Comparative example 12-1 | 0.0 | — | — | x | 880 | 58 |

⊚ ••• not dropped,
○ ••• not dropped but cracked or the like,
x ••• dropped

As shown in Table 12, in Comparative example 12-1 in which the ambient temperature molten salt was not added to the cathode active material layer, the flexibility and the mixture retention characteristics of the cathode active material layer were not sufficient. Thus, when the electrode was punched out with the use of a die, the mixture on the end thereof was dropped. When the battery characteristics were evaluated for the electrode in which the mixture was dropped, the capacity balance between the cathode and the anode at the end thereof was disrupted, and both the battery capacity and the cycle characteristics were lowered.

Meanwhile, in Examples 12-1 to 12-5, the cathode active material layer contained the ambient temperature molten salt. Thus, the mixture was not dropped. Further, based on comparison between example 12-1, 12-5 and Examples 12-2 to 12-4, it was found that if the content ratio of the ambient temperature molten salt in the cathode active material layer was in the range from 0.1 mass % to 5 mass %, significantly favorable cycle characteristics were obtained, the mixture was not dropped, and no crack or the like was occurred.

Examples 13-1 to 13-10

Secondary batteries having a structure similar to that of Example 12-2 were fabricated, except that the type of the ambient temperature molten salt contained in the cathode active material layer was different. However, in Examples 13-5 to 13-8, the ambient temperature molten salt added to the cathode active material layer was previously mixed with a lithium electrolyte salt [lithium bis(trifluoromethanesulfonyl)imide; $Li(CF_3SO_2)_2N$, lithium tetrafluoroborate; $LiBF_4$, lithium hexafluorophosphate; $LiPF_6$, or lithium bis(pentafluoroethanesulfonyl)imide; $Li(C_2F_5SO_2)_2N$].

Specifically, the cathode active material, the electrical conductor, and the binder were mixed. Further, the mixture was simply added with the ambient temperature molten salt previously mixed with the lithium electrolyte salt. After that, the resultant was dispersed in a solvent to obtain cathode mixture slurry. With the use of the cathode mixture slurry, the cathode active material layer was formed. 1 mol of the lithium electrolyte salt was dissolved per 1 $dm^3$ of the ambient temperature molten salt added to the cathode active material layer. For the secondary batteries of Examples 13-1 to 13-8, charge and discharge were performed, and the discharge capacity retention ratio was examined in the same manner as that of Example 12-2. The results are shown in Table 13.

As shown in Table 13, in all Examples 13-1 to 13-8, the significantly superior mixture retention characteristics were shown, and the mixture was not dropped and the electrode was able to be formed. Further, as evidenced by Example 13-2 and Example 13-4, since $DEME.BF_4$ and $PP13.TFSI$ that are a quaternary ammonium salt similarly to DEME.TFSI had the wide electrochemical window and the superior reduction stability, they showed the extremely favorable characteristics.

In Examples 12-5 to 12-8 in which the lithium electrolyte salt was previously mixed to the ambient temperature molten salt added to the cathode active material layer, the higher discharge capacity retention ratio was shown compared to Examples 12-1 to 12-4 in which the lithium electrolyte salt was not previously mixed to the ambient temperature molten salt. That is, it was found that the discharge capacity retention ratio was improved by previously mixing the lithium electrolyte salt to the ambient temperature molten salt added to the cathode active material layer.

Examples 14-1 to 14-5

As Examples 14-1 to 14-5, secondary batteries were fabricated in the same manner as that of Example 12-1, except that the additive amount of the ambient temperature molten salt contained in the cathode active material layer was fixed to 0.2 mass % and the additive amount of the ambient temperature molten salt contained in the anode active material layer was changed as shown in Table 14. Further, as Comparative example 14-1, a secondary battery having a structure similar to that of Examples 14-1 to 14-5 was fabricated, except that the ambient temperature molten salt was not contained in the anode active material layer.

TABLE 13

| | Content ratio of ambient temperature molten salt to cathode solid portion (mass %) | Ambient temperature molten salt | Amount of lithium salt to ambient temperature molten salt (mol/dm$^3$) | Type of lithium salt | Retention of cathode mixture | Battery capacity (mAh) | Retention ratio after 100th cycle (%) |
|---|---|---|---|---|---|---|---|
| Example 13-1 | 0.5 | EMI•TFSI | 0.0 | — | ⊚ | 1003 | 81 |
| Example 13-2 | 0.5 | PP13•TFSI | 0.0 | — | ⊚ | 1010 | 90 |
| Example 13-3 | 0.5 | EMI•BF$_4$ | 0.0 | — | ⊚ | 1008 | 81 |
| Example 13-4 | 0.5 | DEME•BF$_4$ | 0.0 | — | ⊚ | 1007 | 88 |
| Example 13-5 | 0.5 | EMI•TFSI | 1.0 | LiTFSI | ⊚ | 1005 | 85 |
| Example 13-6 | 0.5 | PP13•TFSI | 1.0 | LiTFSI | ⊚ | 1009 | 93 |
| Example 13-7 | 0.5 | EMI•BF$_4$ | 1.0 | LiBF$_4$ | ⊚ | 1000 | 85 |
| Example 13-8 | 0.5 | DEME•BF$_4$ | 1.0 | LiBF$_4$ | ⊚ | 1010 | 92 |
| Example 13-9 | 0.5 | PP13•FSI | 0.0 | — | ⊚ | 1008 | 89 |
| Example 13-10 | 0.5 | PP13•FSI | 1.0 | LiTFSI | ⊚ | 1009 | 92 |

⊚ ••• not dropped,
o ••• not dropped but cracked or the like,
x ••• dropped

TABLE 14

|  | Content ratio of ambient temperature molten salt to anode solid portion (mass %) | Ambient temperature molten salt | Amount of lithium electrolyte salt to ambient temperature molten salt (mol/dm$^3$) | Retention of anode mixture | Battery capacity (mAh) | Retention ratio after 100th cycle (%) |
|---|---|---|---|---|---|---|
| Example 14-1 | 0.1 | DEME•TFSI | 0 | o | 1006 | 84 |
| Example 14-2 | 0.5 | DEME•TFSI | 0 | ⊚ | 1002 | 87 |
| Example 14-3 | 1.0 | DEME•TFSI | 0 | ⊚ | 1005 | 93 |
| Example 14-4 | 5.0 | DEME•TFSI | 0 | ⊚ | 1001 | 89 |
| Example 14-5 | 10.0 | DEME•TFSI | 0 | o | 1001 | 78 |
| Comparative example 14-1 | 0.0 | — | — | x | 740 | 42 |

⊚ ••• not dropped,
o ••• not dropped but cracked or the like,
x ••• dropped

As shown in Table 14, in Comparative example 14-1 in which the ambient temperature molten salt was not added to the anode active material layer, the mixture retention characteristics of the anode active material layer were not sufficient. Thus, when the electrode was punched out with the use of a die, the mixture at the end thereof was dropped. When the battery characteristics were evaluated for the electrode in which the mixture was dropped, the capacity balance between the cathode and the anode at the end thereof was disrupted, and both the battery capacity and the cycle characteristics were lowered.

Meanwhile, in Examples 14-1 to 14-5, the anode active material layer contained the ambient temperature molten salt. Thus, the mixture was not dropped even if the binder made of the polymer compound such as polyvinylidene fluoride was used. Further, based on comparison between Examples 14-1, 14-5 and Examples 14-2 to 14-4, it was found that if the content ratio of the ambient temperature molten salt in the cathode active material layer was in the range from 0.1 mass % to 5 mass %, significantly favorable cycle characteristics were obtained.

Examples 15-1 to 15-10

Secondary batteries having a structure similar to that of Example 14-2 were fabricated, except that the type of the ambient temperature molten salt contained in the anode active material layer was different. However, in Examples 15-5 to 15-8, the ambient temperature molten salt added to the anode active material layer was previously mixed with a lithium electrolyte salt [lithium bis(trifluoromethanesulfonyl)imide; Li(CF$_3$SO$_2$)$_2$N, lithium tetrafluoroborate; LiBF$_4$, lithium hexafluorophosphate; LiPF$_6$, or lithium bis(pentafluoroethanesulfonyl)imide; Li(C$_2$F$_5$SO$_2$)$_2$N].

Specifically, the anode active material, the electrical conductor, and the binder were mixed. Further, the mixture was simply added with the ambient temperature molten salt previously mixed with the lithium electrolyte salt. After that, the resultant was dispersed in a solvent to obtain anode mixture slurry. With the use of the anode mixture slurry, the anode active material layer was formed. 1 mol of the lithium electrolyte salt was dissolved per 1 dm$^3$ of the ambient temperature molten salt added to the anode active material layer. For the secondary batteries of Examples 15-1 to 15-10, charge and discharge were performed, and the discharge capacity retention ratio was examined in the same manner as that of Example 14-2. The results are shown in Table 15.

TABLE 15

|  | Content ratio of ambient temperature molten salt to anode solid portion (mass %) | Ambient temperature molten salt | Amount of lithium salt to ambient temperature molten salt (mol/dm$^3$) | Type of lithium salt | Retention of anode mixture | Battery capacity (mAh) | Retention ratio after 100th cycle (%) |
|---|---|---|---|---|---|---|---|
| Example 15-1 | 0.5 | EMI•TFSI | 0.0 | — | ⊚ | 1003 | 80 |
| Example 15-2 | 0.5 | PP13•TFSI | 0.0 | — | ⊚ | 1010 | 91 |
| Example 15-3 | 0.5 | EMI•BF$_4$ | 0.0 | — | ⊚ | 1008 | 80 |
| Example 15-4 | 0.5 | DEME•BF$_4$ | 0.0 | — | ⊚ | 1007 | 80 |
| Example 15-5 | 0.5 | EMI•TFSI | 1.0 | LiTFSI | ⊚ | 1005 | 85 |
| Example 15-6 | 0.5 | PP13•TFSI | 1.0 | LiTFSI | ⊚ | 1009 | 95 |
| Example 15-7 | 0.5 | EMI•BF$_4$ | 1.0 | LiBF$_4$ | ⊚ | 1000 | 82 |
| Example 15-8 | 0.5 | DEME•BF$_4$ | 1.0 | LiBF$_4$ | ⊚ | 1010 | 83 |
| Example 15-9 | 0.5 | PP13•FSI | 0.0 | — | ⊚ | 1007 | 88 |
| Example 15-10 | 0.5 | PP13•FSI | 1.0 | LiTFSI | ⊚ | 1010 | 93 |

⊚ ••• not dropped,
o ••• not dropped but cracked or the like,
x ••• dropped

As shown in Table 15, in all Examples 15-1 to 15-8, the significantly superior mixture retention characteristics were shown, the mixture was not dropped, and the electrode was formed. Further, in Examples 15-5 to 15-8 in which the lithium electrolyte salt was previously mixed to the ambient temperature molten salt added to the anode active material layer, the higher discharge capacity retention ratio was shown compared to Examples 15-1 to 15-4 in which the lithium electrolyte salt was not previously mixed to the ambient temperature molten salt. That is, it was found that the discharge capacity retention ratio was improved by previously mixing the lithium electrolyte salt to the ambient temperature molten salt added to the anode active material layer.

The present invention has been described with reference to the embodiments and the examples. However, the present invention is not limited to the foregoing embodiments and the foregoing examples, and various modifications may be made.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A battery comprising:
   a cathode;
   an anode; and
   an electrolytic solution,
   wherein at least one of the anode and the cathode has a current collector having a pair of opposed faces and first and second active material layers provided on the opposed faces of the current collector, each of the first and second active material layers containing an ambient temperature molten salt and an active material,
   wherein a content ratio of the ambient temperature molten salt in each of the first and second active material layers ranges from 0.1 mass% to 5 mass%, and
   wherein a thickness of each of the first and second active material layers is 85 μm to 125 μm.

2. The battery according to claim 1 that is a lamination type secondary battery.

3. The battery according to claim 1, wherein at least one of the cathode and the anode is spirally wound so that a minimum curvature radius is 2.0 mm or less.

4. The battery according to claim 1, wherein the active material layer further contains a lithium electrolyte salt, and
   the lithium electrolyte salt is previously mixed with the ambient temperature molten salt and is contained in the electrode mixture slurry.

5. The battery according to claim 4, wherein the lithium electrolyte salt includes at least one lithium electrolyte salt selected from the group consisting of lithium hexafluorophosphate, lithium tetrafluoroborate, lithium bis(trifluoromethanesulfonyl)imide, and lithium bis(pentafluoroethanesulfonyl)imide.

6. The battery according to claim 1, wherein the active material contains a lithium nickel composite oxide expressed as $LiNi_xCo_{1-x}O_2 (0 \leqq x \leqq 1)$.

7. The battery according to claim 1, wherein the current collector is made of a copper foil.

8. The battery according to claim 1, wherein the current collector is made of a nickel foil.

9. The battery according to claim 1, wherein the current collector is made of a stainless foil.

10. The battery according to claim 1, wherein each of the active material layers contains at least one of a vinylidene fluoride-based polymer and an acrylonitrile-based polymer.

11. The battery according to claim 1, wherein the anode has the first and second active material layers containing the ambient temperature molten salt, and wherein the anode includes an anode active material selected from the group consisting of a carbon material, a material containing tin and a material containing silicon.

12. The battery according to claim 1, wherein a volume density of each of the first and second active material layers is 1.75 g/cm$^3$ if the first and second active material layers are anode active material layers and 3.52 g/cm$^3$ if the first and second active material layers are cathode active material layers.

* * * * *